Jan. 12, 1965  F. H. OSBORNE ETAL  3,165,321
AUTOMATIC PHONOGRAPH
Original Filed Oct. 26, 1953  12 Sheets-Sheet 1

INVENTORS.
FRED H. OSBORNE.
SVEN W. E. ANDERSSON.
BY ROBERT SHERMAN TUTTLE.

Lockwood, Galt, Woodard & Smith.
ATTORNEYS.

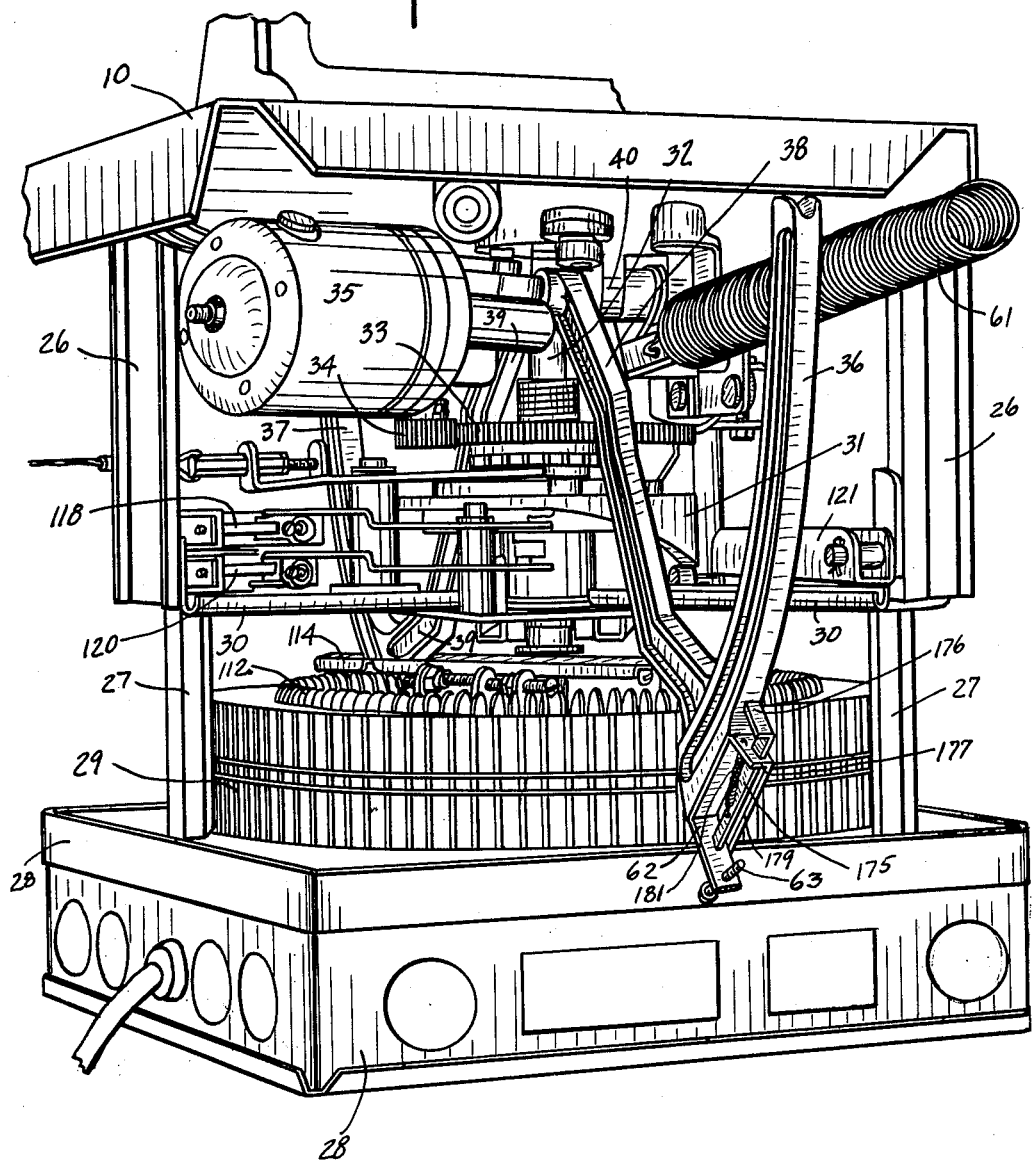

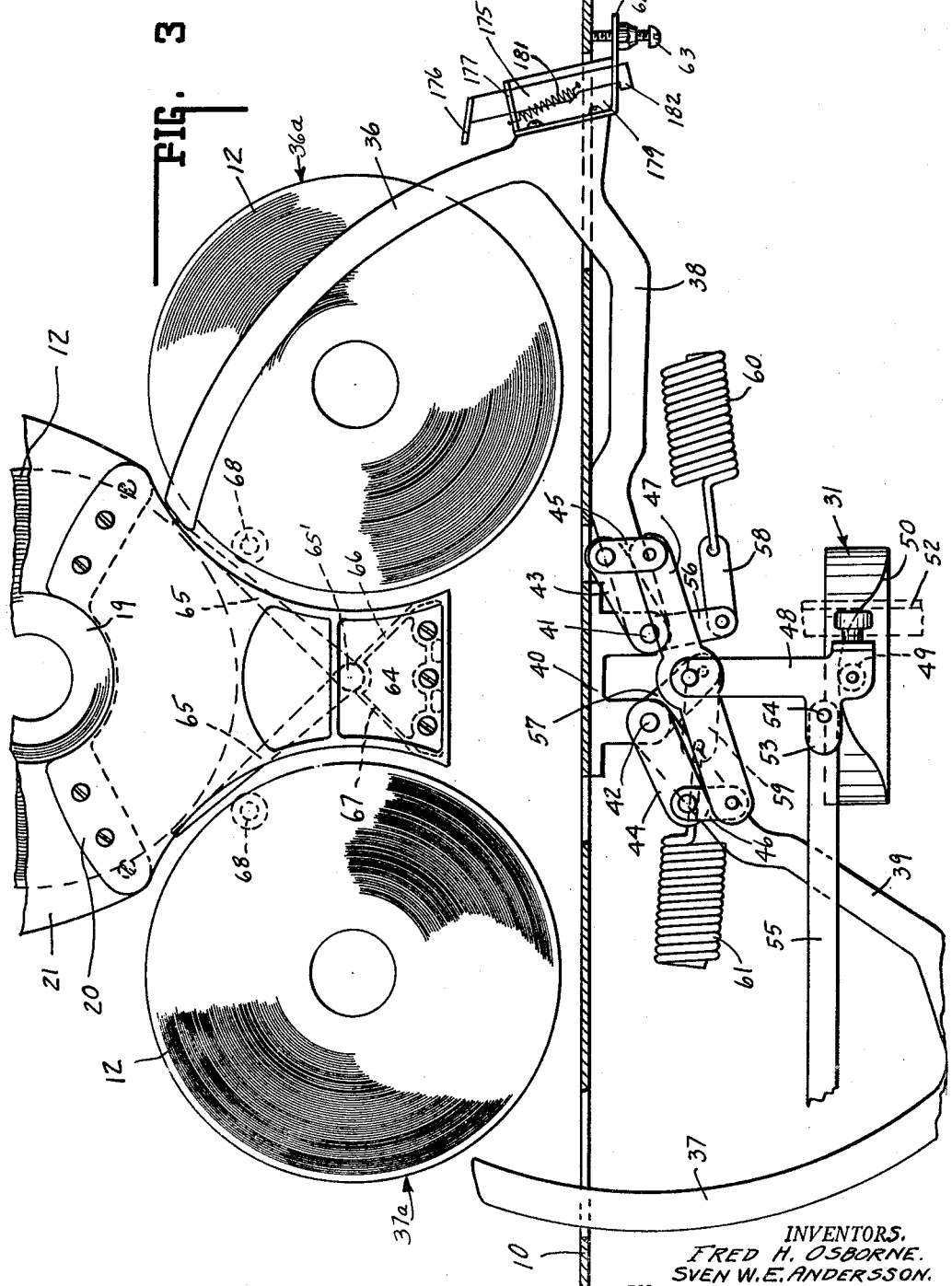

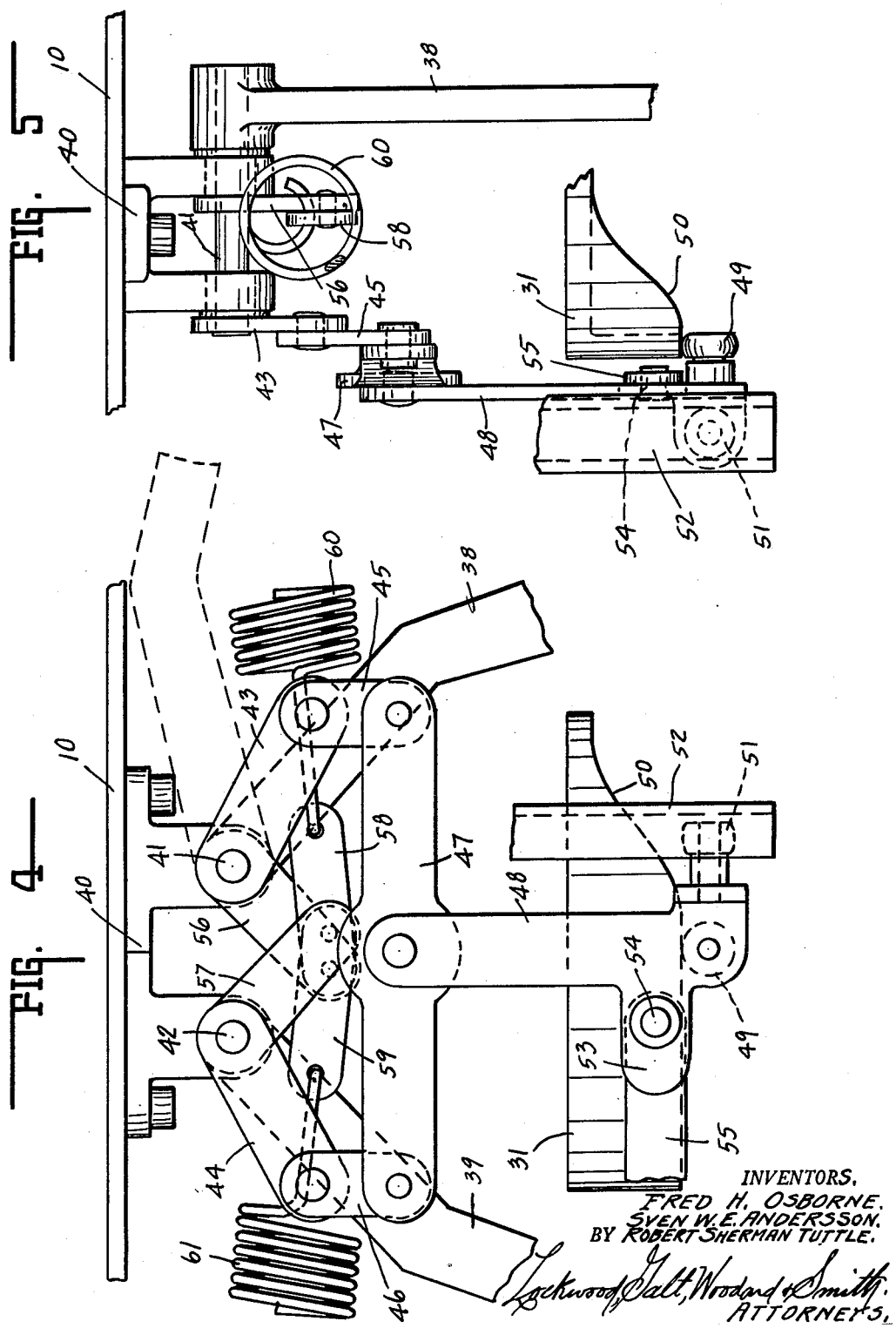

Jan. 12, 1965 F. H. OSBORNE ETAL 3,165,321
AUTOMATIC PHONOGRAPH
Original Filed Oct. 26, 1953 12 Sheets-Sheet 5
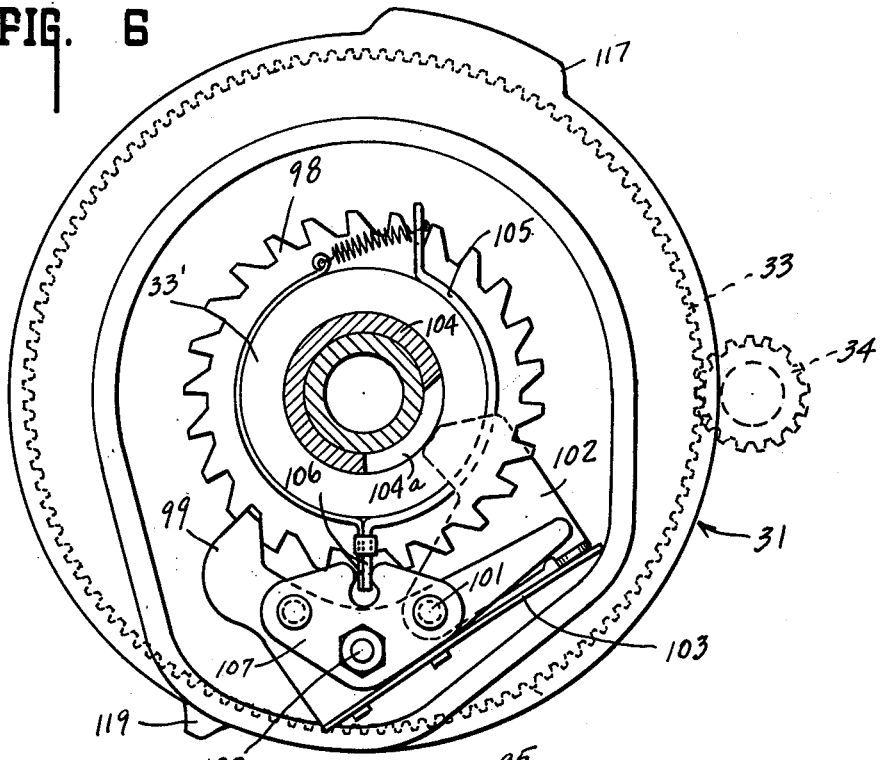
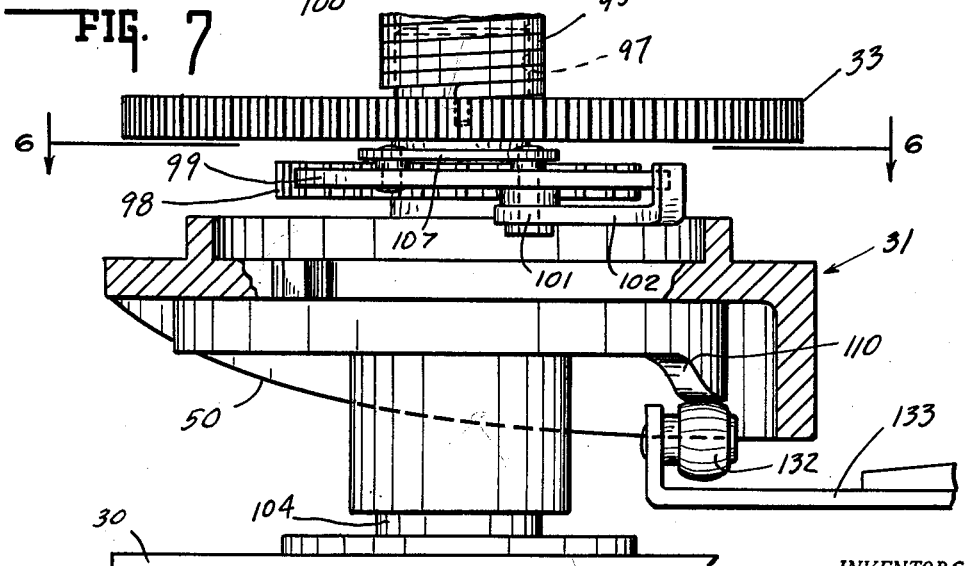
INVENTORS.
FRED H. OSBORNE,
SVEN W. E. ANDERSSON.
BY ROBERT SHERMAN TUTTLE.
Lockwood, Galt, Woodard & Smith,
ATTORNEYS.

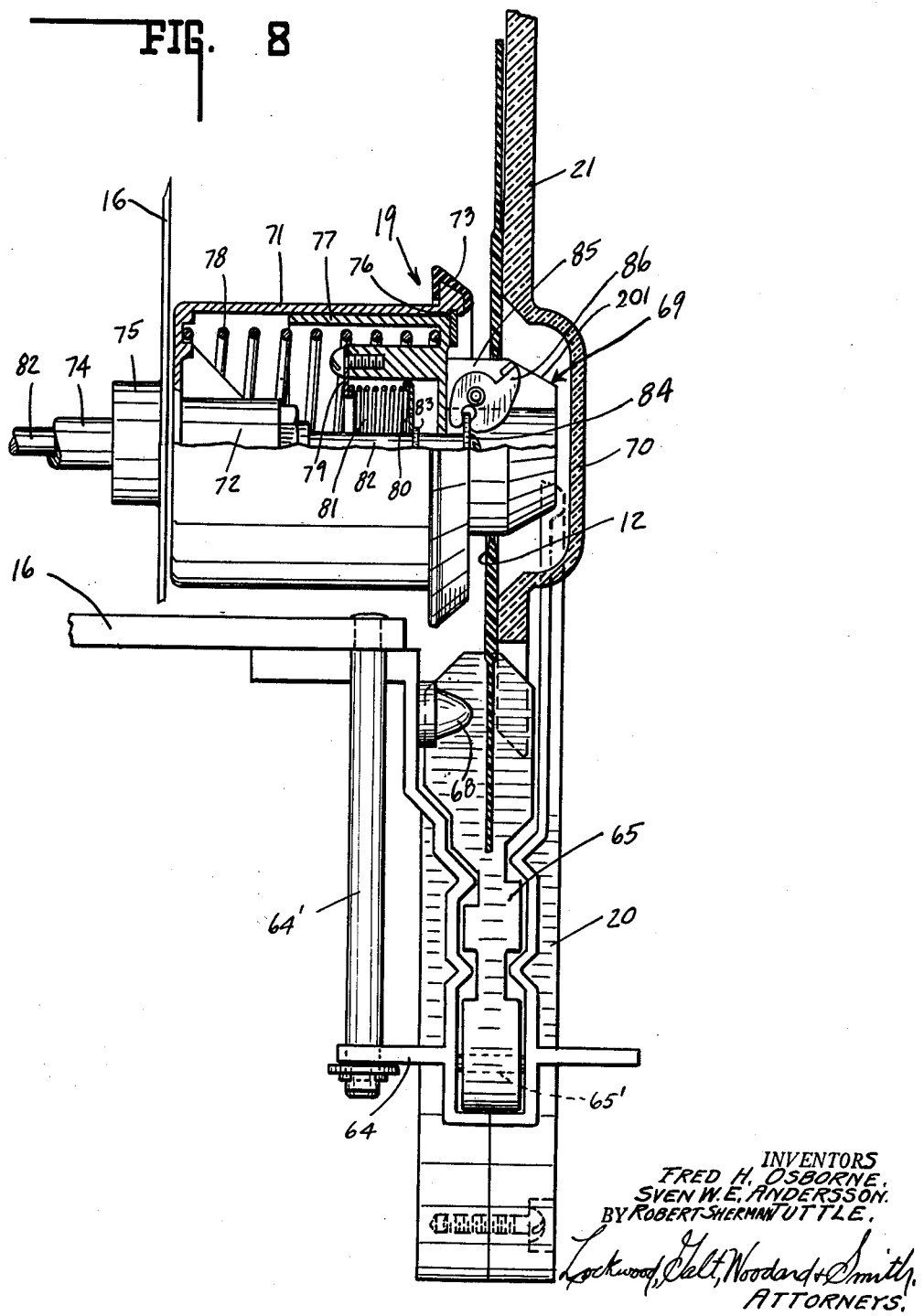

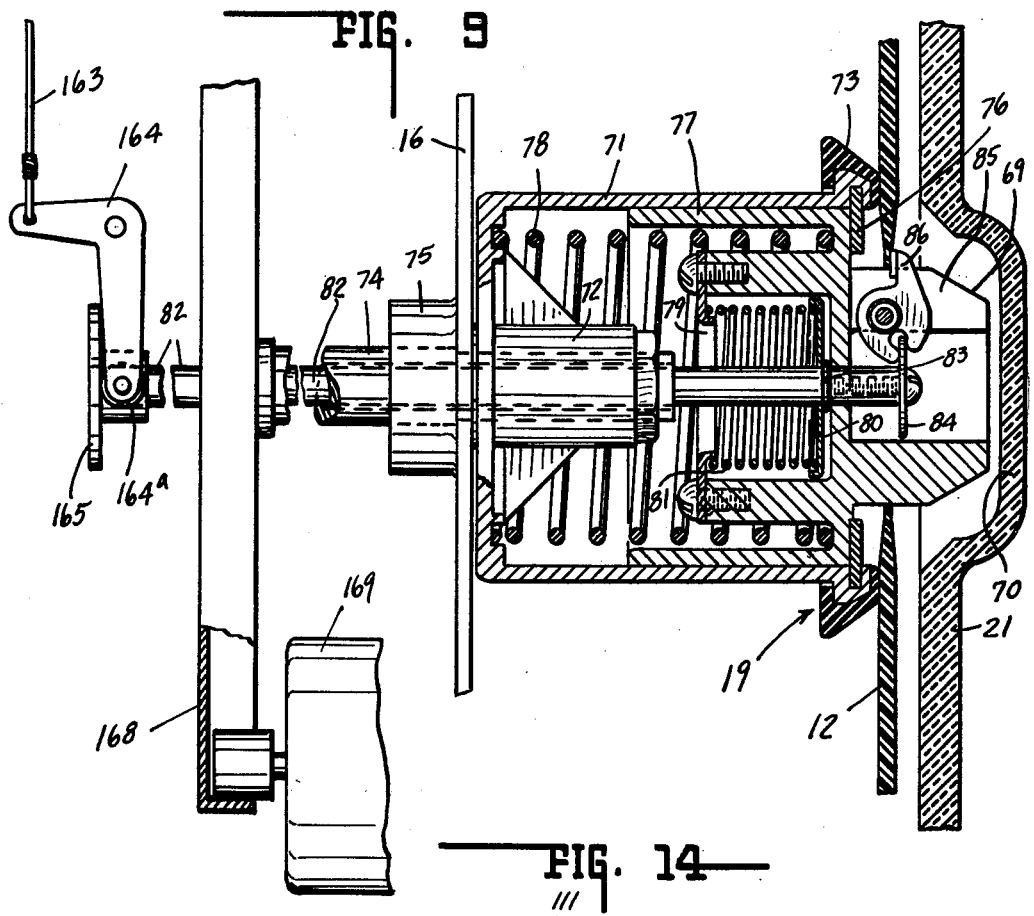
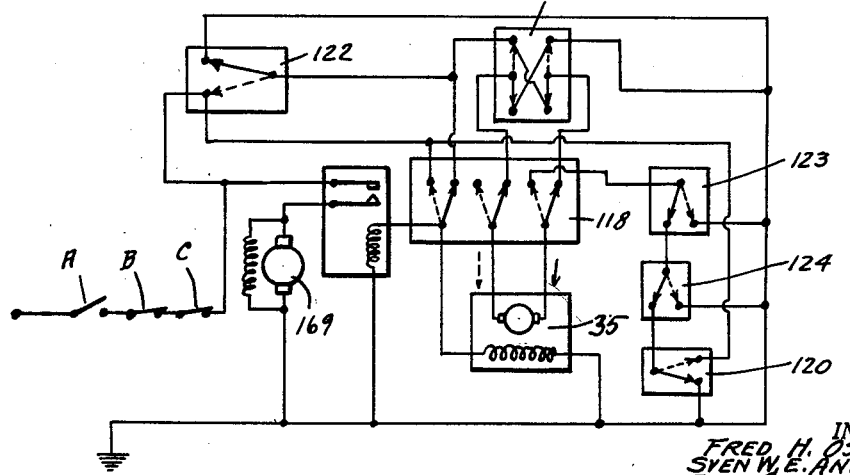

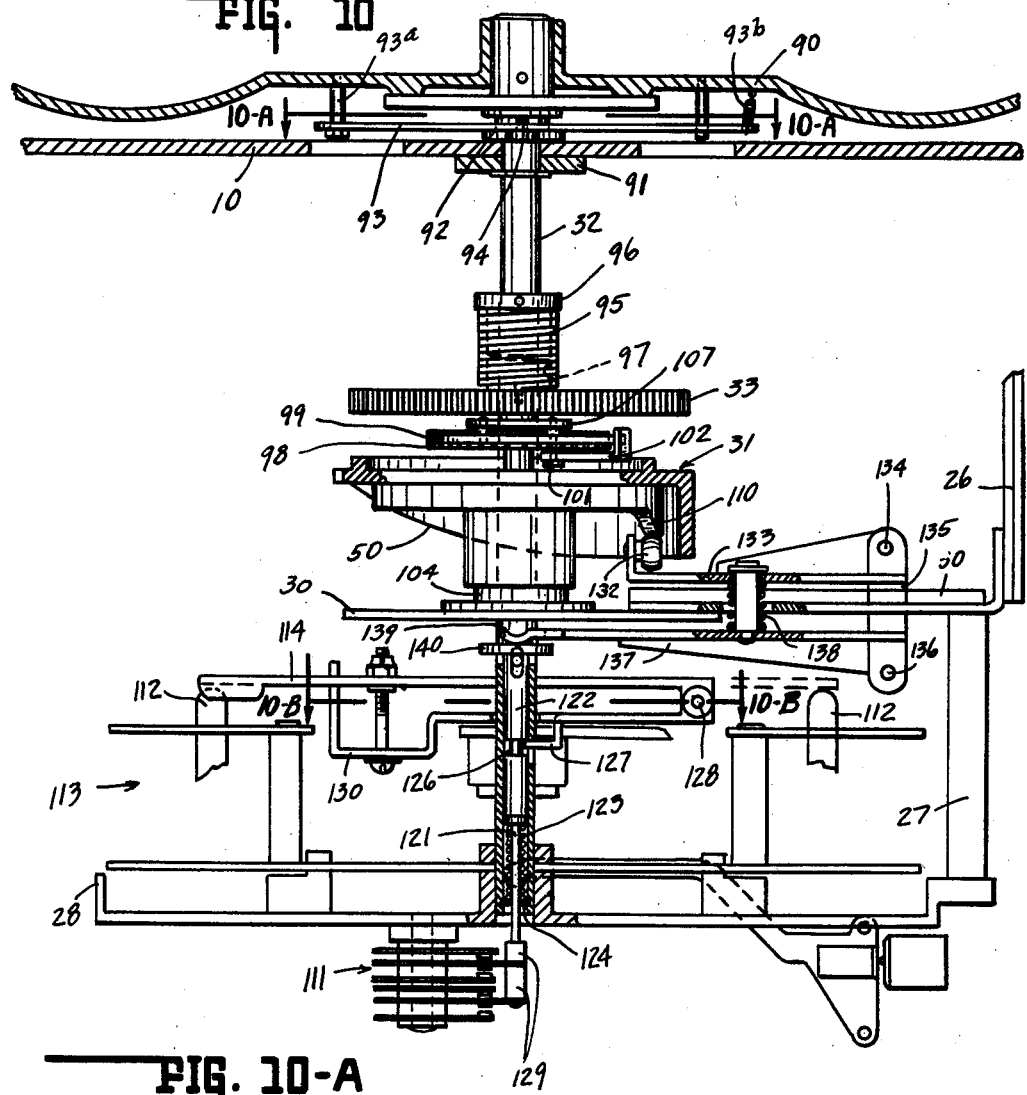
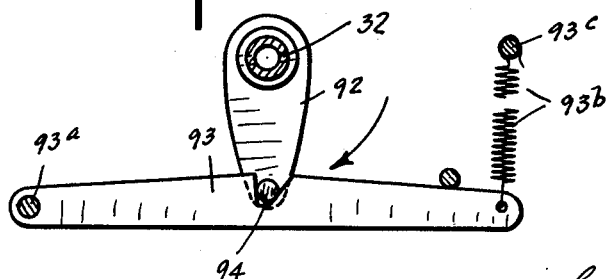

Jan. 12, 1965  F. H. OSBORNE ETAL  3,165,321
AUTOMATIC PHONOGRAPH
Original Filed Oct. 26, 1953  12 Sheets-Sheet 9
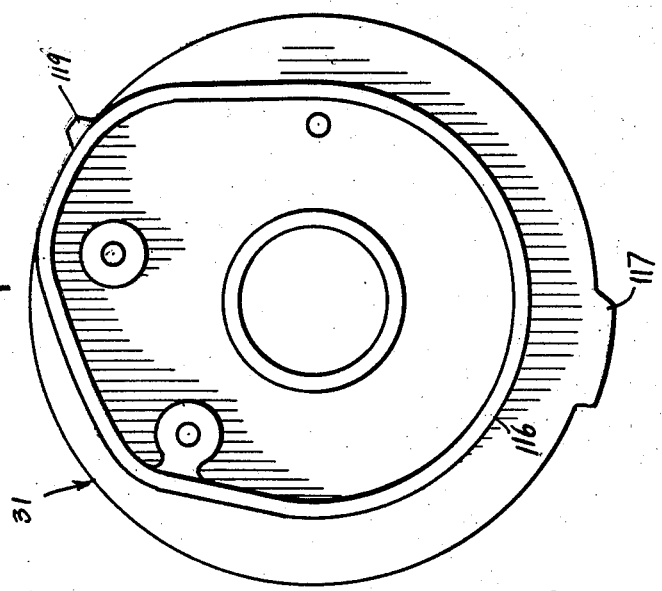
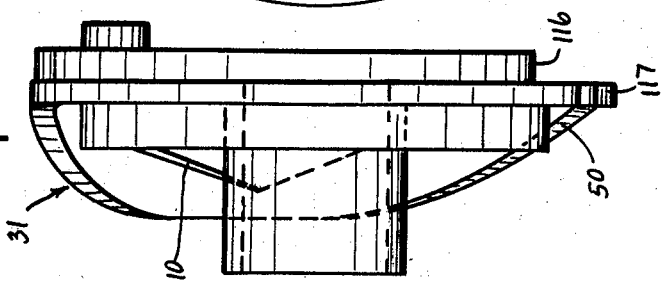
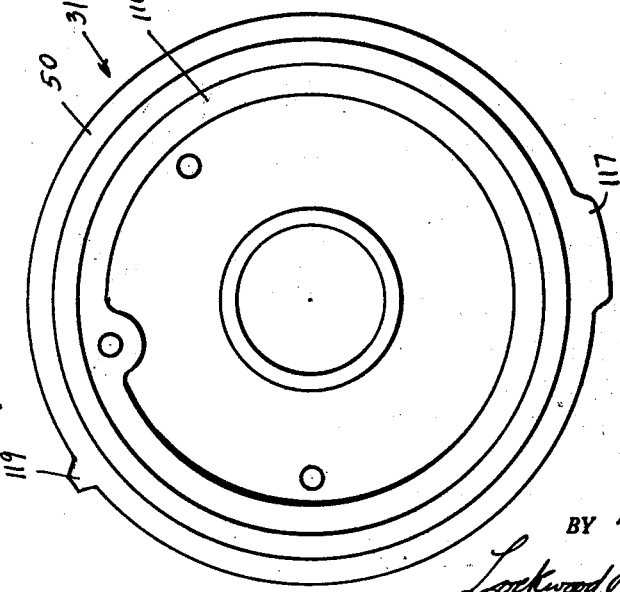
INVENTORS.
FRED H. OSBORNE,
SVEN W. E. ANDERSSON,
BY ROBERT SHERMAN TUTTLE.
Lockwood, Galt, Woodard & Smith,
ATTORNEYS.

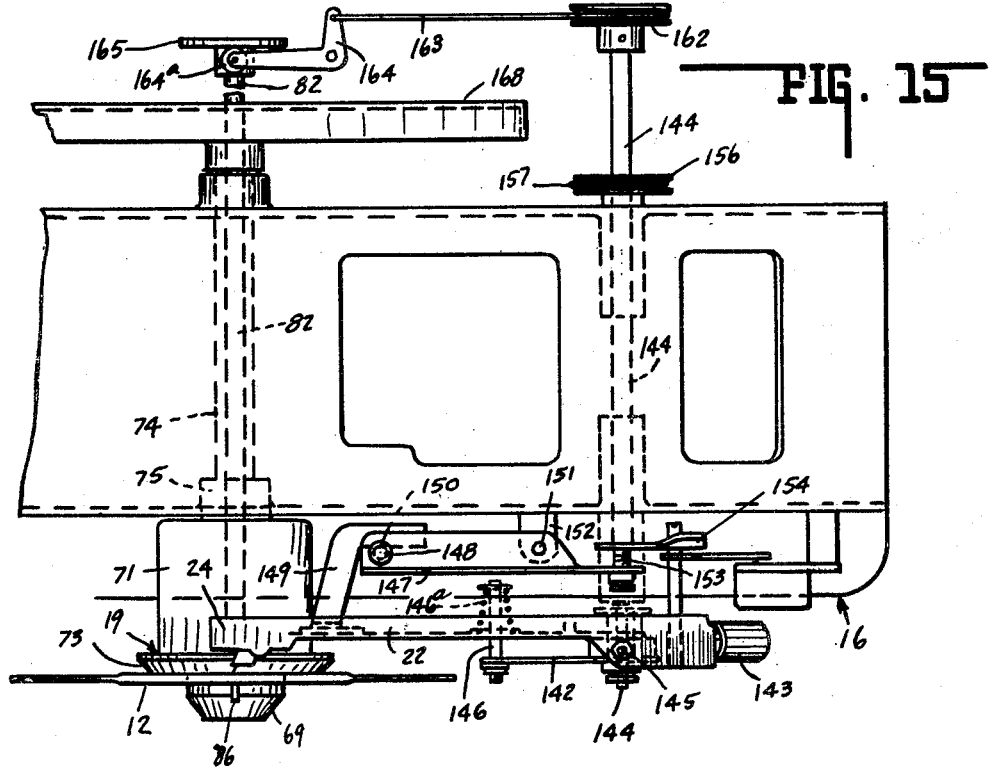
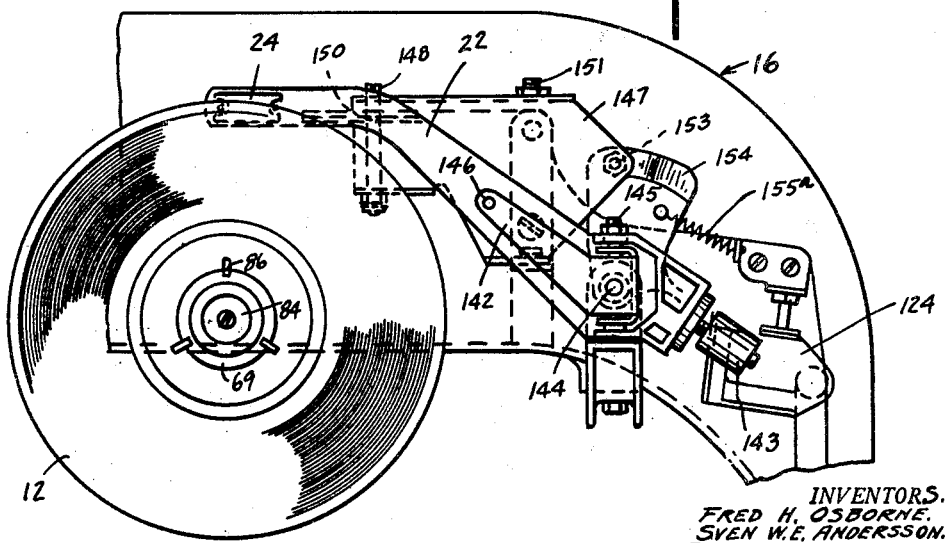

Jan. 12, 1965   F. H. OSBORNE ETAL   3,165,321
AUTOMATIC PHONOGRAPH
Original Filed Oct. 26, 1953   12 Sheets-Sheet 11
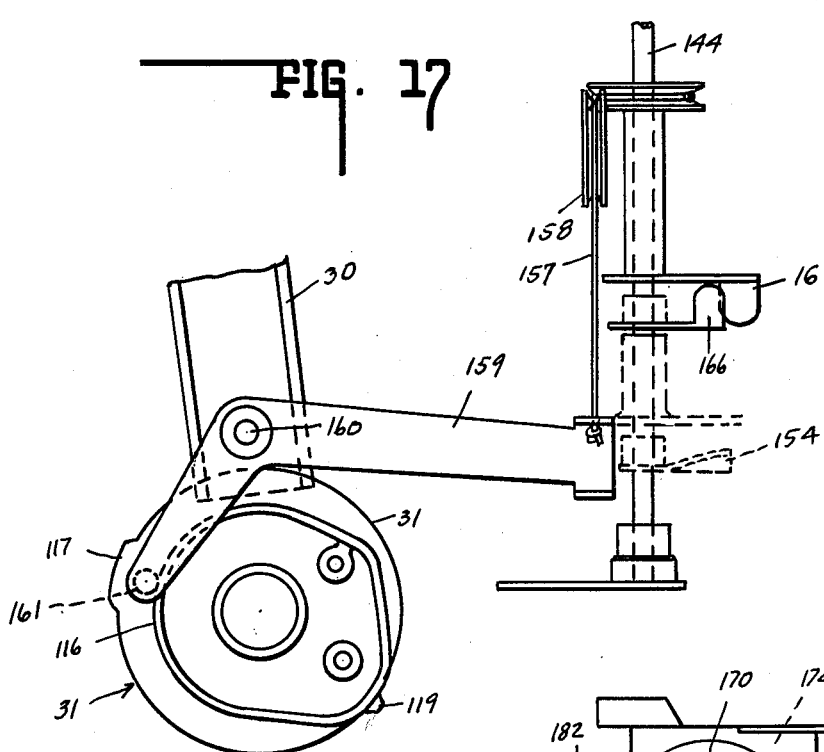
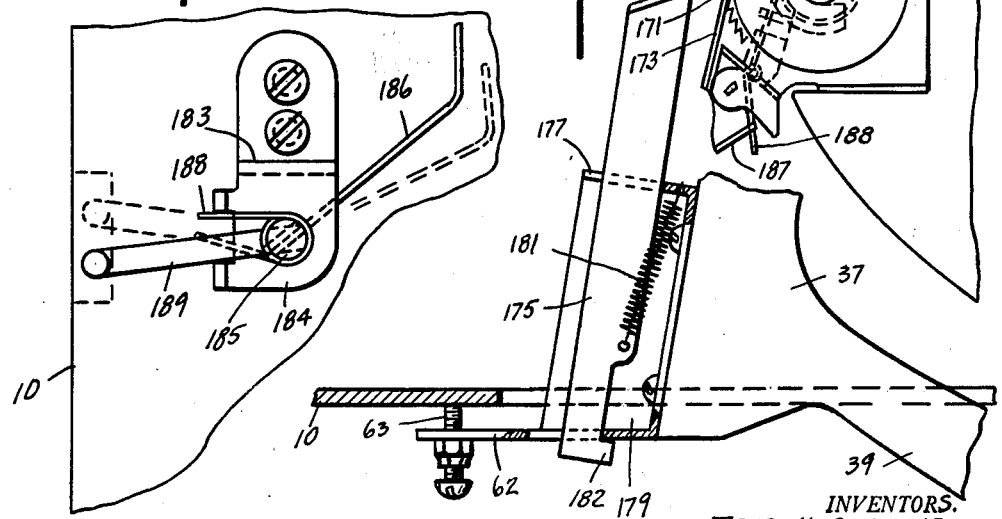
INVENTORS.
FRED H. OSBORNE.
SVEN W. E. ANDERSSON.
BY ROBERT SHERMAN TUTTLE.
Lockwood, Galt, Woodard & Smith,
ATTORNEYS.

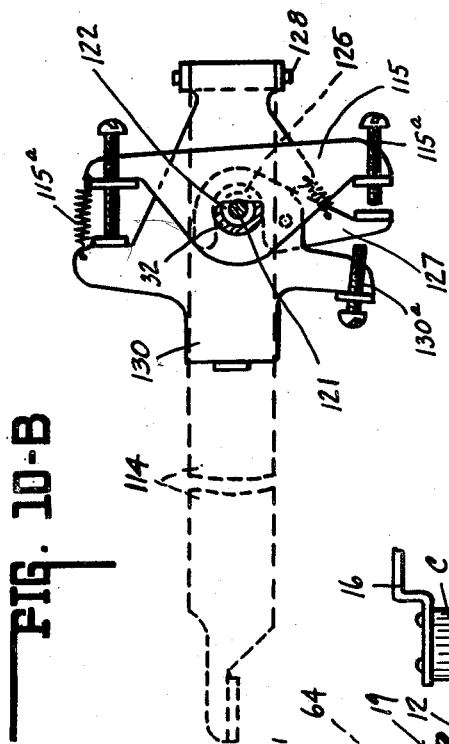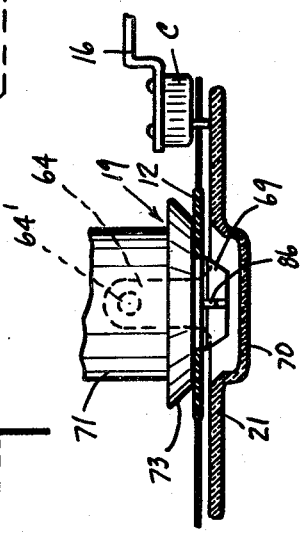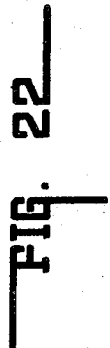

3,165,321
AUTOMATIC PHONOGRAPH
Fred H. Osborne, Snyder, N.Y., Sven W. E. Andersson, St. Joseph, Mich., and Robert S. Tuttle, Eggertsville, N.Y., assignors to The Wurlitzer Company, Chicago, Ill., a corporation of Ohio
Continuation of application Ser. No. 388,242, Oct. 26, 1953. This application Mar. 21, 1961, Ser. No. 97,259
38 Claims. (Cl. 274—10)

This invention relates to an automatic selective type of record changing mechanism primarily adapted for a coin operated phonograph.

This application is a continuation of my application Serial No. 388,242, filed October 26, 1953, entitled "Automatic Phonograph," now abandoned.

It is the object of the invention to provide a greatly simplified automatic record changer of relatively few parts through which a selected side of a selected record may be reproduced; and which is particularly adaptable to selectively reproduce a large number of selections, on the order of two hundred, through the manipulation of one hundred records.

The above is accomplished through the medium of a horizontally rotatable magazine provided with a peripheral series of radial pockets each containing an individual record in vertical upstanding position arranged fan-like relative to the axis of rotation of the magazine. A vertically disposed turntable is positioned centrally above the magazine in axial relation thereto to which a selected record may be presented from either side, depending upon the position of the magazine and the side of the record to be reproduced. A single tone arm and reproducer unit is positioned to engage and reproduce a selected side of the record in accordance with the direction from which the record is received. In this manner one or the other selected side is reproduced in accordance with the angular displacement of the magazine carrying the selected record to one or the other side of the turntable.

One feature of the invention resides in providing a single reversible motor operable in one direction to rotate the magazine to present a selected side of the selected record to the turntable for reproduction, and in the reverse direction to actuate the record changing mechanism for shifting the selected record from the magazine to the turntable and returning it from the turntable to the magazine; center and clamp the record on the turntable and present the reproducer thereto.

A further feature of the invention resides in the record centering and clamping head horizontally shiftable to engage and center a record on the turntable and clamp it thereto for rotation in a vertical plane, said head being actuated by and in timed relation with the record shifting mechanism.

Still a further feature of the invention resides in the differential linkage and spring operation, including opposite but angularly offset record shift arms, so arranged that upon one arm registering with the record for shifting it to one side of the turntable, the opposed and angularly offset arm will be restrained from entering the magazine and registering with a record. Thus, only one of the opposed record shift arms will be effective, depending upon the angular displacement of the rotatable magazine.

Another feature of the invention resides in the latching mechanism associated with the selector pin scanning arm adapted to snap under a spring action to actuate the motor reversing switch to set the record shifting mechanism into operation upon the magazine being selectively positioned to present a selected record to the turntable and selected side of said record to the reproducer for play.

Still a further feature comprises a safety switch operable to break the operating circuit to stop the machine upon a record failing to completely return to the magazine. In event of a record jamming between the guide plate and magazine, the initial rotation of the magazine will cause the jammed record to tilt the guide plate sufficiently to actuate the circuit control safety switch, bringing the entire operating mechanism to a standstill until the jammed record is removed.

Another feature lies in a manual control adapted to simultaneously operate a master switch to break the magazine operating circuit and swing the magazine indexing pawls to inoperative position to thereby prevent jamming in event a selector pin is extended during the loading and unloading of the records, as well as the removal of defective jammed records.

A further feature of the invention resides in the provision of an individual play meter for each magazine record pocket and a play meter resetting device operable to reset all play meters upon the mere rotation of the magazine.

Other features of the invention will be made apparent and set forth more in detail in the accompanying specifications and the attached drawings.

The full nature of the invention will be understood from the accompanying drawings and the following description and claims:

FIG. 2 is a perspective view of the magazine positioning and record shifting mechanism.

FIG. 3 is a front elevation of the record shifting mechanism showing a record shifted from one side of the magazine to the turntable for reproduction of a selected side, with parts removed for clearness.

FIG. 4 is an enlarged view showing a front elevation of the cam actuated differential linkage for controlling the record shift arms with parts broken away.

FIG. 5 is the same as FIG. 4 showing a side elevation thereof.

FIG. 6 is a plan view of the clutch mechanism for driving the main cam, taken on the line 6—6 of FIG. 7.

FIG. 7 is a side elevation of the clutch mechanism of FIG. 6, with parts broken away.

FIG. 8 is a central vertical section through a portion of the turntable showing a record centered thereon before clamping, and including the record guide track for directing it from the magazine to the turntable, parts being in elevation.

FIG. 9 is a central vertical section through the turntable showing the record centering and clamping head in record clamped and playing position, with parts in elevation and broken away.

FIG. 10 is an elevational view with parts shown in section and parts removed illustrative of the magazine drive shaft and actuating cam.

Figure 1:
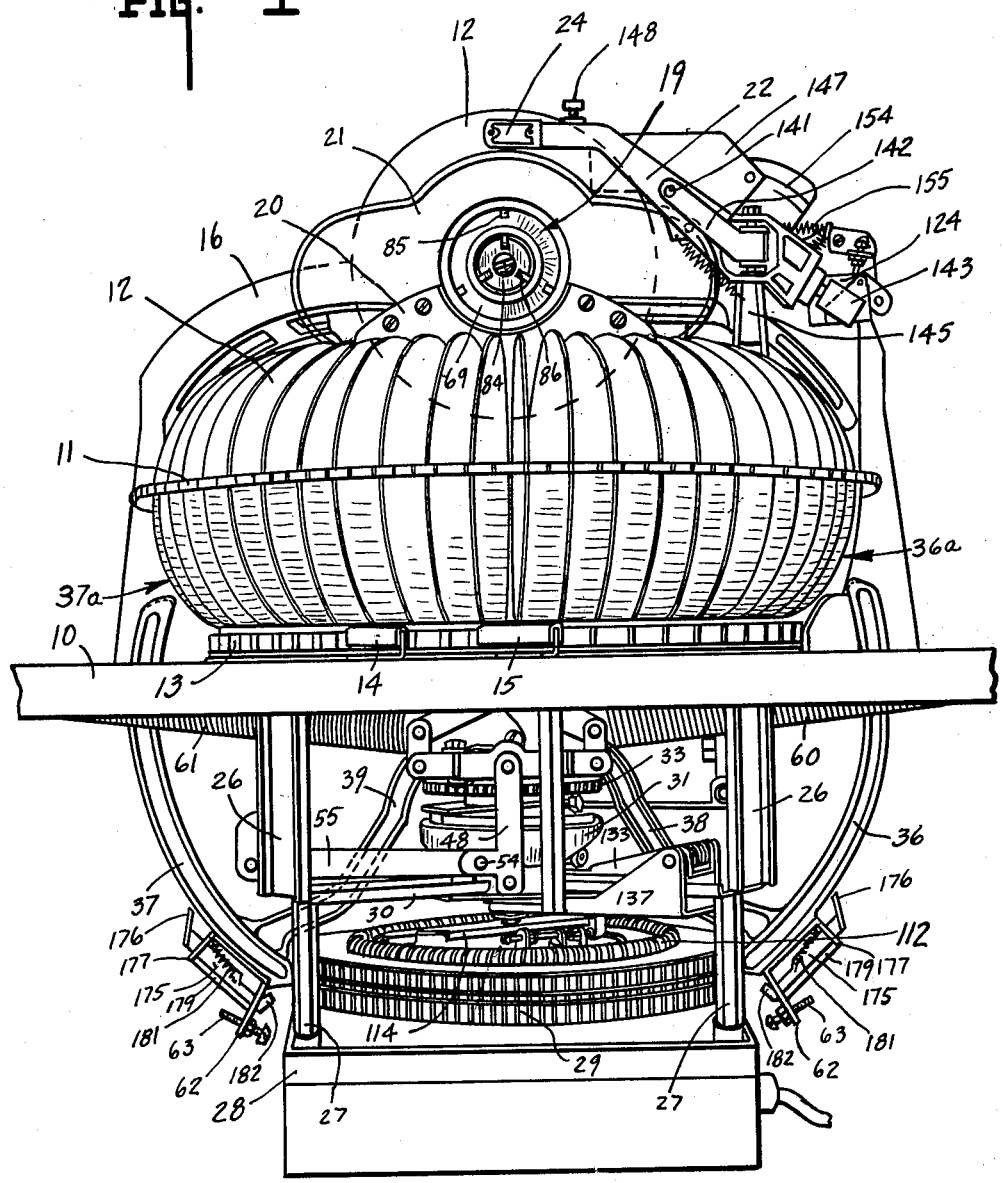
FIG. 1 is a front elevation of the record changer showing it in rest position and with a series of records positioned in the magazine.

FIG. 10-A is a plan view taken on the line 10-A—10-A of FIG. 10, showing the magazine drive.

FIG. 10-B is a plan view of the selector pin scanning arm and motor reversing switch control, reference being made to FIG. 10.

FIG. 11 is a plan view of the lower face of the main cam.

FIG. 12 is a side elevation thereof.

FIG. 13 is a plan view of the upper face of the main cam.

FIG. 14 is a wiring diagram illustrative of the circuit and the several control switches.

FIG. 15 is a plan view of the tone arm control with parts removed and parts broken away.

FIG. 16 is a front elevation of the tone arm and control therefor, with parts removed and parts broken away.

FIG. 17 is a diagrammatic illustration of the cam controlled cable for operating the tone arm and the centering and clamping head.

FIG. 18 is a side elevation with parts removed and parts shown in section illustrative of the play meter.

FIG. 19 is a top plan view showing a portion of the magazine and illustrative of the play meter reset mechanism.

FIG. 20 is a partial section through the record on the turntable and guide plate with the safety switch held in circuit closing position.

FIG. 21 is the same as FIG. 20 with the guide plate tilted by a jammed record to release the safety switch to break the circuit.

FIG. 22 is a plan view of the master switch and magazine pawl release.

In the drawings, and referring to FIG. 1, there is shown a record changing mechanism supported upon a base plate 10. Mounted for rotation about a vertical axis there is provided a magazine 11 having a series of (fifty-two) radially-disposed record receiving pockets in which the individual records 12 are carried on edge to extend radially of the axial center of rotation of the magazine. Supporting the magazine and rotatable therewith there is an indexing plate 13 having a series of ratchet teeth thereabout, one for each pocket and record. Carried by the base plate plate 10 there is a pair of spring pawls 14 and 15 riding into engagement with the teeth of the indexing plate for restraining it against rotation in a direction reverse to that of the direction of rotation for record selection. For reasons hereinafter more particularly set forth, said sping pawls are so relatively spaced as to alternately interlock with the teeth of the indexing plate.

Supported above the base plate 10 there is a frame 16 upon which there is mounted the turntable 19, record tracking frame 20 and record guide plate 21. Said frame 16 also mounts a tone arm 22 carrying a reproducer 24 for reproduction of one or the other side of the record supported by the turntable in a playing station 25a, FIG. 3.

Suspended below the base plate 10 by the brackets 26 and 27 there is a chassis box 28 carrying the electric circuits, solenoids and switches for selectively actuating the selector pins of the record selector drum 29. On a sub-base frame 30 supported by said brackets, there is rotatably mounted in suitable bearings a main cam 31 operative in the manner hereinafter described for controlling the shifting of the record from the magazine to the turntable, the centering and clamping thereof, and the tone arm control.

There is provided a main drive shaft 32 (FIGS. 2 and 10) secured at its upper end to a releasable drive mechanism for effecting rotation of the magazine. Said shaft 32 is selectively driven in one direction only by the driving gear 33 through the pinion 34 by a reversible record selecting and changing motor 35. Through suitable clutch means to be hereinafter described, said motor when operating in one direction rotates the drive shaft and magazine in a clockwise direction, when looking down thereon, until it is arrested by one of the selector pins of the selector 29. Thereupon a reversing switch is actuated to reverse the direction of the motor 35 which, through the clutch means, allows the magazine to remain in its arrested position and drives the main cam 31 in the opposite direction to shift the record.

For shifting the record from the magazine (FIG. 3) to the turntable there is provided a pair of opposed arcuate shift arms 36, 37, each carried by a bearing arm 38, 39, respectively. As will presently appear, the two record shift or pusher arms 36, 37 are operatively alined with two record transfer stations 36a and 37a into which the records 12 are moved by rotation of the magazine 11. The two transfer stations 36a and 37a are located generally on diametrically opposite sides of the vertical axis of the magazine 11 and have respectively central vertical planes which are turned in relation to each other at an acute angle equal to one-half of the radial angle between adjacent records in the magazine. Said bearing arms have their inner bearing ends pivotally supported on the underside of the base plate to permit independent record shifting movement. Upon the magazine being positioned to locate a selected record in one of the transfer stations 36a, 37a in alinement with the adjacent pusher arm 36, 37, the opposite arm will be restrained from operation by the magazine so that only the selected arm may then roll a record into position to be secured to the turntable 19 for reproduction of one or the other side, depending upon the arm thus selected. Thus, with a single tone arm and reproducer a record will be reproduced on one side if positioned by the rotating magazine in the plane of the turntable for shifting by one of said arms, and on the other side thereof if positioned by the magazine in the plane of the turntable for shifting by the opposite said arm. The selection of the side of the record to be reproduced is, therefore, determined by the positioning of the record for shifting to the turntable from one or the other side thereof.

Record Shifting Mechanism

As shown in FIGS. 3, 4, 5 and 8, the base plate 10 carries a bearing bracket 40 in which there is mounted a pair of spaced shafts 41 and 42. Secured to said shafts there is a pair of arms 43 and 44, respectively. The free end of the arm 43 is pivotally connected to a link 45 and similarly the free end of the arm 44 is pivotally connected to a link 46. Said links 45 and 46 at their opposite ends are each pivotally connected to an equilizing bar 47. Said bar in turn is pivoted intermediate its ends to an arm 48 depending from the equalizing bar and carrying from its opposite end a cam follower 49. Said cam follower 49 is positioned to track a cam profile 50 of the main cam 31. The lower end of said arm 48 also carries a stabilizing roller 51 riding on a vertical track 52 secured to the frame. In addition thereto said arm is provided with an ear 53 pivotally connected at 54 with a stabilizing strap 55 pivoted at its opposite end to one of the brackets 26 (FIG. 1). Also, secured to the respective shafts 41, 42 are angularly disposed arms 56, 57, respectively, their free ends being pivotally connected to the links 58, 59, respectively. Connected to the free ends of said links there are provided tension load springs 60, 61, respectively. The opposite ends of said springs are fixedly secured to the base plate 10. Also secured to said shafts 41, 42 are the lifting arms 38, 39, respectively, rigid with the arcuate shift arms 36, 37.

In respect to the operation of the shift arms it is to be noted that they are slightly out of line with each other in that while their lifting arms 38, 39 extend in opposite directions they are slightly offset so as to lie in different vertical planes to the extent of one-half the angular displacement between the record receiving pockets of the magazine. Accordingly, when the magazine is arrested with a pocket and record in the transfer station 36a aligned with the shift arm 36, no record will be positioned in the transfer station 37a and the shift arm 37 will lie in a plane between two adjacent records in the magazine. Similarly, when the shift arm 37 is aligned with a record, the arm 36 will be out of record alignment. With this arrangement, when the magazine is positioned to present a record to arm 36, it may freely move through the magazine pocket to shift the record into position for centering on the turntable. But the arm 37 will be restrained from movement through engagement with the magazine since it cannot enter a pocket. For this reason the differential linkage above described is provided.

As best illustrated in FIGS. 3 and 4, when the cam profile forces the cam follower 49 and arm 48 downwardly to its lowermost position against the tension springs 60, 61, as shown in FIGS. 4 and 5, the shafts 41, 42 will be rotated by the equalizing bar 47 and connecting linkage to lower both arms 36, 37 free of the magazine to permit its rotation to a selected position. As the cam 31 revolves to permit the cam follower 49 to ride upwardly on the profile 50 under tension of said springs, the equalizing bar 47 will normally permit both shift arms to move upwardly. However, due to the offset relation of said arms, only one of them will have been aligned with the record, such as arm 36 in FIG. 3. Arm 37 will be restrained from upward movement through engagement of its free end with the magazine intermediate the records. This will cause the equalizing bar to tilt as it is moved upwardly, shaft 42 being restrained from rotation by arm 37 while shaft 41 will be permitted maximum rotation under tension spring 60 to swing the shift arm 36 upwardly through the aligned slot in the magazine to the position shown in FIG. 3, pushing the record contained therein with it into position to be centered on the turntable. For limiting its upward movement and adjusting the extent thereof to accurately position the record for centering on the turntable, the arm 36, as well as the arm 37, is provided with a protruding bracket extension 62 carrying an adjustable stop screw 63 positioned to engage the underside of the base plate 10 (see FIG. 18).

Upon the magazine being indexed to record selecting position to register a record with the shift arm 36, one of the spring pawls 14, 15 (FIG. 22) drops into latching position with one of the ratchet teeth on the indexing plate 13. The magazine is thus restrained from reverse movement, which may be permitted by declutching of its driving clutch spring hereinafter described. The other spring pawl, however, is located midway of a ratchet tooth and engaged in latching position only when the magazine is positioned for registering a record with the shift arm 37 on the opposite side. Since the shift arms 36 and 37 are slightly offset relative to each other, one spring pawl locks in when one of said arms is aligned with a record while the other locks in when the opposing arm is in record alignment.

*Record Positioning on Turntable*

Disposed centrally of the annular and rotatable magazine there is provided a bearing plate 64 which is pivotally mounted on the shaft 64'. Said plate carries the record guide frame 20 and is normally biased in alignment with the plane of the turntable, said bearing plate being pivoted on the frame 16 (FIGS. 3 and 8). The frame 20 pivotally monuts a record tracking arm or switch 65 at 65' to swing from the position shown in full line (FIG. 3) to dotted line position. Said tracking arm is swung from one position to the other by the record 12 as it is pushed upwardly from the magazine by one or the other shift arms 36, 37. It is swung into alignment with one or the other sloping tracks 66, 67 formed in the frame 20 (FIG. 3) and forms a continuation of the tracks 66, 67.

Upon the record being pushed upwardly from the magazine by the nose of the shift arm 36, it will roll up the track 66 and tracking arm 65, to the upper extreme position of the arm 36 as may be permitted by the stop screw 63 (FIG. 18). The tracking arm guides the record into position to be centered on the turntable 19. In FIG. 3 the record is shown in its extreme upper position having rolled up the track 66 and arm 65. However, if the magazine is positioned to align the record with the arm 37, said record will be rolled up track 67, flipping the tracking arm 65 to the position shown in dotted lines.

As shown in FIG. 3, each of the record support tracks 66, 67 as extended by the track switch element 65 is substantially straight and is so inclined and positioned that the upper end of each track extends above and clears the toroidal path through which records are moved by the magazine and a downward continuation of the lower end of each track is substantially tangential to the lower portion of the adjacent one of the transfer stations 36a and 37a into which records are moved by the magazine.

For guiding the record on the tracking arm to a position adjacent the plane of the turntable, the frame 20 carries the record guide plate 21 slightly spaced forwardly of the turntable and provided with beveled edges which, in conjunction with the control guide buttons 68, insures the record being shifted along its inner face. Upon the record being thus positioned substantially axially of the turntable, a forwardly beveled centering and clamping head 69 is projected through the center opening of the record and into an aligned guide plate bulge 70. The record, lying against the guide plate 21 and being engaged by the beveled face of the centering head, will be cammed thereby into accurately centered relation to the turntable and clamped thereon in the manner hereinafter more particularly described.

The camming action of the centering head 69 will remove the record from contact with the nose of the shift arms 36 or 37 and free it from the track 65 for rotation in a record playing station on the turntable with one or the other of its faces presented to the reproducer. Having reference to FIG. 8, the record to be played is cammed away from the track element 65 and away from the record pushing end of the coacting arm 36, 37 by an annular cam surface 201 formed on the projecting end of the centering head 69 and having a truncated conical form. It will be appreciated that the positional relationship of the parts is such that the minimum spacing of the axis of the turntable from the track element 65 (when the track element is in either of its two operating positions) and the minimum spacing of the turntable axis from the record pushing end of each arm 36, 37 each exceeds the radius of an individual record by a dimensional amount which is less than the radial span of the annular cam surface 201, thus enabling the cam surface 201 to enter the central hole in the record and lift the record clear of both the track element 65 and the coacting pusher arm. Upon completion of the play the centering and clamping head 69 will release the record back to the nose of the shift arm. Thereupon cam 31 will rotate to lower the equalizing bar 47, oscillating shafts 41, 42, to lower the actuated shift arm, permitting the record to roll back into its pocket in the magazine and free the magazine from both shift arms for indexing to a new position.

However, if a record should jam, due to warpage or any other cause, and fail to completely return to the magazine, the entire record changing mechanism will be stopped before causing any damage. This is accomplished in the manner illustrated in FIGS. 8, 20, and 21, wherein the operating circuit (FIG. 14) is controlled by a safety switch "C" mounted on the frame 16 adjacent the turntable. Said switch is normally closed when the guide plate 21 is in its normal position, as shown in FIG. 20. In this position the guide plate bears against the contact bottom of said switch, closing the circuit, being positioned above and to one side of the record and its path of travel to the magazine. A jammed record will be forced against the guide plate 21 upon the initial rotation of the magazine to cock said plate about its pivot at 64' (FIG. 8). This action will cause said plate to release switch C, breaking the operating circuit. The entire machine will then be inoperative until the jammed record is removed.

*Turntable Centering and Clamping Head*

The turntable carries a record for rotation in a vertical plane above the magazine, and which plane of rotation lies diametrically of the magazine. The turntable consists of a cup-like drum 71 having an internal boss 72 and a beveled rubber record engaging forward rim 73 (FIGS. 8 and 9). The turntable is secured to a rotatable turntable shaft 74 rotatably mounted in a bearing 75 of the frame 16. Extending inwardly from and fixed to the drum 71 there is a retaining ring 76 for limiting the outward movement of the centering head 69. Said head extends forwardly from an enlarged sleeve 77 slidably mounted within the drum for permitting said head to be retracted inwardly and projected outwardly from the rim 73. The sleeve 77 is provided with an annular recess in which there is mounted a compression spring 78 normally urging the sleeve 77 and head 69 into projected record centering position, as shown in both FIGS. 8 and 9. Carried inwardly of the sleeve 77 there is a bearing plate 79 associated with an opposed bearing plate 80. A compression spring 81 is interposed between said bearing plates.

Extending axially through the turntable drive shaft 74, said bearing plates and head, there is an actuating rod 82 having a fixed collar 83 within the head bearing against the plate 80. An actuating disk 84 is secured to the forward end of said rod. The head 69 is provided with a series of radial slots 85 in each of which there is pivotally mounted a record clamping finger 86. The inner end of each finger 86 is bifurcated to embrace the periphery of the actuating disk 84. The opposite end of each finger is positioned to extend radially outward from the head in position to engage the inner peripheral portion of the record and clamp it on the turntable rim 73, as shown in FIG. 9.

For positioning a record on the turntable and removing it therefrom, the actuating rod 82 is retracted to an extreme position wherein it compresses spring 81 to oscillate the clamping fingers inwardly of the head from the position shown in FIG. 9 to that shown in FIG. 8. Continued rotation will then compress the spring 78 wherein the forward face of the head 69 is drawn into the drum 71 inwardly of the plane of the turntable rim 73. Thus, the record may be readily rolled into centering position between the turntable and the guide plate 21. The actuating rod is then projected, permitting spring 78 to force the head 69 forwardly through the center opening in the record and into the bulge 70 in the plate 21. Due to the beveled contour of the centering head the record is cammed upwardly from the shift arm and track onto the cylindrical portion of the head in truly centered position. Continued projected movement of the actuating rod 82 under tension of spring 81 moves the actuating disk 84 forwardly to swing the clamping fingers from the position shown in FIG. 8 to that of FIG. 9 in a direction to engage and clamp the inner portion of the record against the turntable rim and free of the guide plate 21.

The record is thus clamped firmly against the rim 73 in turntable centered position and held under tension of spring 81. Upon completion of the play, reverse action takes place, the actuating rod 82 being retracted to first release the clamping fingers against tension of spring 81 and ultimately withdraw the centering head 69 into the drum clear of the record against tension of the spring 78. The record is then freed to move downwardly onto the nose of the shift arm, which, upon retraction by the cam 31, will cause the record to roll down the tracking arm 65 into its magazine pocket.

*Magazine Drive*

The radial record receiving pockets of the magazine 11 are concave, as shown in FIG. 10, terminating centrally in a bearing plate 90 rotatably supported by the base plate 10. The magazine drive shaft 32 extends through suitable bearings 91 in the base plate to be secured to drive arm 92 for rotating it in a clockwise direction looking down thereon, as indicated by the arrow in FIG. 10–A.

A drive lever 93 is pivotally connected at 93a to the underside of the bearing plate 90. The opposite end of said lever is biased toward the shaft 32 by a spring 93b connected to said plate at 93c. Said lever is provided with a driving and camming notch intermediate its ends into which a drive pin 94 on the end of the arm 92 extends. Said notch has a radial drive face and a trailing camming face. Upon the arm 92 being rotated in the direction of the arrow, the drive face is engaged to rotate the magazine. Upon the magazine being rotated by hand for record loading purposes relative to the shaft, the pin 94 cams out of the notch to thereby free the magazine. This arrangement permits "free-wheeling" of the magazine about the drive shaft.

The shaft 32 is driven in said clockwise direction by the motor 35. The driving connection between the gear 33 and the shaft 32 comprises a clutch spring 95 surrounding said shaft with one end thereof confined by a collar 96 secured to the shaft, and the other end connected to a boss 97 secured to the gear. Thus, upon the gear being driven in said clockwise direction, the clutch spring 95 will wind up about the collar 96 and boss 97 to rotate the shaft therewith. But upon the gear being driven in a reverse direction, upon reversal of the motor 35, the shaft will become declutched.

Upon the motor being reversed to drive the gear 33 counterclockwise viewed from the top (FIGS. 6, 7), the record shifting cam 31 will be rotated to actuate the record shift arms 36, 37, as well as the record centering and clamping head and the tone arm. The gear 33 is formed with a projecting collar carrying a ratchet wheel 98 in which a driving pawl 99 is engageable upon the gear rotating in the last-mentioned direction. Said pawl is pivotally mounted upon the upper face of the cam through the pivotal connection therewith at 100. Thus, upon the gear being driven in one direction, the magazine is rotated through the clutch spring 95 with the cam standing idle, and when driven in the opposite direction the cam is rotated through the pawl and ratchet 98, 99, while the magazine remains idle.

To prevent the usual noise of a pawl riding over the ratchet teeth when rotated in a non-driving direction, provision is made for holding the pawl clear of tooth engagement. To this end the gear 33 has a boss 33' surrounded by a friction band 105 provided with a radially extending finger 106. Said finger extends between a pair of camming nose portions on the pawl actuating plate 107 secured to the pawl 99. The boss 33' surrounds and rotates relative to the stud 104 extending upwardly from, and fixedly secured to the sub-base frame 30 (FIGS. 6 and 10). Upon the gear and ratchet being driven counterclockwise, said boss 33' urges the band 105 and finger in a direction to force the pawl into ratchet-tooth engagement. But upon said gear being rotated in the opposite direction, the plate 107 and pawl are forced free of tooth engagement. Thus, there is no spring basing of the pawl, such as to cause a ratcheting noise, it being positively engaged or freed by the friction band 105. However, to insure tooth engagement by the pawl, it is provided with a tail member 102 which is pivoted at 101 in yielding association with the spring 103. The nose of said member rides on the periphery of the fixed stud 104, thus yieldingly retaining the pawl in tooth engagement until relative rotation between said boss 33' and fixed stud brings a recess 104a into registry with said nose. The pawl is thus permitted to be moved free of tooth engagement.

From the foregoing it will be observed that the single reversible motor, through ratchet and spring clutches, will rotate the magazine to its arrested record selected position, whereupon through reversal of the motor the main drive shaft and magazine will be declutched and the main cam driven to shift the selected record from the magazine to the turntable; center and clamp it thereon and present the reproducer thereto; and release the record for return to the magazine following play, ready for the next operation.

*Selector Mechanism and Control Circuit (FIG. 14)*

The control circuit consists of a coin switch A connected to the operating source of potential, a manually operated, normally closed master switch B and a safety switch C, all connected in series to energize or deenergize the circuits of the turntable drive motor 169 and the record changer motor 35. The turntable drive motor 169 is connected in series with switches A, B and C through the contacts of the override relay to ground. The record changer motor 35 is connected through switches A, B and C and also through the override switch 122, transfer switch 118, selector switch 111, play switch 120, cancel switch 123 and trip switch 124. The selector switch 111 is a double pole, double throw reversing switch which acts to reverse the motor connections for reversing record changer motor 35. The transfer switch 28 functions to transfer connection of the record changer motor to the circuit, including play switch 120, trip switch 124 and cancel switch 123. The functions of these various switches will be described in more detail in subsequent description.

Said circuit is principally operated by the cam 31 (FIGS. 11, 12 and 13), wherein the bottom profile 50 of said cam actuates the record shift arms, as above described. There is also provided in said cam a profile 110 operable upon the motor selector or reversing switch 111 being actuated, as hereafter described, for cancelling a projected selector pin 112. Said selector pins, two hundred and four in all, are arranged in annular formation in the selector drum generally indicated at 113, mounted on the chassis box 28. Said selector drum is in all respects similar to and operated in a manner heretofore set forth and described in Letters Patent No. 2,631,856 (FIG. 10), granted March 17, 1953, for Automatic Phonograph, wherein each selector pin is released to be projected upwardly upon an associated solenoid (not shown) being energized through a remote control selector. Upon said pin 112 being projected upwardly it extends into the path of rotation of a scanning arm 114 driven by the hollow drive shaft 32 which rotates the magazine to selected position.

As shown in FIGS. 10 and 10-B, there is associated with the scanning arm 114 a mounting bracket 130 to which it is pivoted at 128. Fixed to the shaft 32 there is a mating drive bracket 115 which rotates the bracket 130 and scanning arm 114 through the spring connection 115a. Pivoted upon the bracket 130 there is a latch 127 having a head extending intermediate opposed and adjustable stop screws carried by said brackets normally in spaced relation. Said latch has a hooked tail portion normally entering an elongated slot in the hollow drive shaft 32 to engage and latch with a shouldered recess 126 in the plunger 122.

The set screws 115a and 130a are provided for adjusting the angular operative relation of the scanning arm relative to said shaft so that when it strikes and is arrested by a projected selector pin the magazine will be positioned thereby to accurately align the selected record with one of the record shift arms 36 or 37. Upon the magazine thus being arrested, the driving motor 35 will be reversed, as hereinafter described, to release its drive of shaft 32 and drive the cam 31. Upon rotation of the cam, the profile 110 will cause the projected selector pin to be cancelled out through the depressing action on the scanning arm 114 and reset the motor reversing switch 111 (FIG. 10).

On the upper face of the cam there is provided a cam profile 116 which actuates the record centering and clamping head 19 through the medium of the actuating rod 82, as well as the tone arm, in the manner hereinafter set forth. Projecting from the periphery of the cam there is provided a lobe 117 which actuates the triple pole transfer switch 118 (FIGS. 2 and 14). Also protruding from the periphery of the cam there is a lobe 119 which actuates a play switch 120 to break the circuit and deenergize the record changing motor 35 with the record in playing position.

The motor reversing or selector switch 111 is mounted below the selector drum as shown in FIG. 10. It is actuated by a rod 121 extending downwardly from the plunger 122 slidable in the lower end of the hollow shaft 32. Said plunger and rod are biased upward by a spring 123 surrounding the rod and compressed between the plunger and a disk 124 secured within the lower end of the hollow shaft 32. Said plunger is provided with the shouldered recess 126 normally engaged by the latch 127 extending through the elongated slot in said shaft (FIG. 10-B).

This arrangement is such that upon the scanning arm being arrested in its rotation by a projected selector pin, continued rotation of shaft 32 will cause stop screw 115a on the bracket 115 to engage the latch 127 and swing it free of latching engagement with the recess 126 in the plunger 122 (FIG. 10-B). Therefore spring 123 will force said plunger and rod 121 upwardly to actuate the reversing switch 111 through the insulating plugs 129. The motor 35 will thereby be reversed to disconnect said magazine drive shaft 32 and drive the cam 31.

Upon rotation of the cam 31, the reversing switch 111 having been actuated upon arresting of the scanning arm, the cam lobe 110 depresses a cam follower 132 which is secured to an arm 133 pivoted at 134 upon a bracket 135 secured to the sub-base 30. Pivoted to the other and lower end of said bracket at 136 there is an arm 137 spring connected with arm 133 by a spring 138 interposed therebetween. An extension of the arm 137 is bifurcated at 139 to embrace shaft 32 and bear downwardly against a disk 140 riding on a pin carried by the upper end of the plunger 122. The arm 137 thus depresses and plunger 122 to be again latched in its lowermost position by the latch 127. At the same time the motor reversing switch 111 is reset for the next cycle of operation. Simultaneously with the above, the depressed disk 140 will force the scanning arm 114 downwardly about its pivotal mounting 128 to cancel out and reset the projected selector pin 112.

When the play switch 120 is snapped to its dotted line position (FIG. 14) to arrest the cam, the motor is braked by shorting out the armature through a circuit including the cancel switch 123 and the trip switch 124. When either one of the latter switches snaps to the dotted line position, the braking circuit is open and the motor started. The transfer switch 118 snaps to full line position when the final position has been reached. If the override switch 122 is then in the dotted line position because another selector pin or pins are projected, the motor is again reversed to immediately start the selection movement by clutching the driving gear 33 to the shaft 32. If no pin is projected so that the override switch 122 is in full line position, the motor is declutched and the armature shorted for some braking effect.

*Record Centering and Tone Arm Control*

The tone arm 22 is mounted for universal movement upon the frame 16, being pivoted on a horizontal axis 144 through the medium of a spaced parallel arm 142 and balanced by an adjustable balance weight 143 (FIGS. 15, 16). The tone arm is also mounted to oscillate about a vertical axis on the supporting pivots in the bearings 145 relative to said arm 142. The free end of the arm 142 has mounted thereon an adjustable pin 146 extending freely through an aperture in the tone arm to mount a compression spring 146a positioned to urge the reproducer against the face of the record under adjustable spring pressure. Thus, the tone arm and reproducer are biased through the medium of the spring on arm 142 towards engagement with the back face of the record 12 when the tone arm is freed for record tracking.

The trip switch 124 above referred to is mounted upon said frame in position to be actuated upon the reproducer reaching the innermost end of the playing groove. For returning the reproducer and tone arm from its tripping position free of record engagement, whereby record transfer may be effected, there is provided a pivoted plate 147 carrying a notched tone arm positioning rod 148. Secured to the rear side of the tone arm there is provided a rearwardly extending hook 149 which hooks over the positioning rod 148 for engagement in a notch 150 provided therein. The plate 147 is fulcrumed at 151 upon a bracket 152, the end of said plate remote to the positioning rod being provided with an adjustable bearing screw 153. Said bearing screw is engageable by a camming plate 154 mounted on the shaft 144. Said camming plate is adapted to be oscillated by the shaft 144 to swing said plate in a direction for the positioning rod 148 to withdraw the reproducer from record engagement through the hook 149, as shown in FIG. 15.

Oscillation of said shaft in the other direction against the tension of a spring 155a permits the bearing screw 153 to ride inwardly on the camming plate 154 with the consequent engagement of the reproducer with the record and the freeing of the tone arm hook 149 from the notch 150 in the rod 148, permitting the tone arm to track the record under tension of spring 146a. Upon the tone arm tracking to the end of the record groove, it will actuate the trip switch 124 to again energize the motor 35 and rotate cam 31, which, through means hereinafter described, will oscillate the shaft 144 in the opposite direction. The camming plate 154 will thereupon swing the plate 147 in a direction to engage the hook 149 and withdraw the reproducer from record engagement, whereupon it will be returned to its starting position with the hook 149 latched in the notch 150.

For oscillating the shaft 144 to control the setting of the tone arm, said shaft is provided with a pulley 156 about which there is secured a cable 157 extending downwardly through an opening in the base and about a free wheeling guide pulley 158 for connection with a bell crank lever 159 (FIG. 17). Said bell crank lever is fulcrumed at 160 upon the sub-base frame 30, and is provided with a cam follower 161 at its other end positioned to track the cam profile 116 of the cam 31. Also secured to the shaft 144 there is a second pulley 162 oscillatable with said shaft, and to which is secured a second cable 163 (FIGS. 9 and 15) leading to a bell crank lever 164 having a roller 164a on its actuated end engaging with a disk 165 secured to the actuating rod 82 operable to retract said rod against the tension of springs 81 and 78 successively (FIG. 9).

Thus, upon oscillation of the shaft 144, which controls the tone arm, the actuating rod 82 is shifted to permit the centering head 89 to project into record centering position and the clamping fingers 86 into clamping engagement with the record. This action occurs just prior to the release of the tone arm for record engagement. To limit the oscillatory movement of the shaft 144 it is provided with a stop arm 166 having an adjustable screw bearing adapted to engage a fixed projection on the frame 16, the cam operated bell crank lever being under spring load through the medium of the centering head spring 78 and 81.

The turntable and its drive shaft 74 may be driven by a turntable drive motor in any suitable manner, there being shown herein for illustration a driving fly wheel 168 (FIG. 9) having a driving rim driven through the usual friction wheel by the turntable motor 169. The turntable motor 169 is energized through the closing of the coin switch A and selector circuit upon the phonograph being placed in operation.

*Play Meter and Reset*

In coin operated phonographs it is the practice to record the number of plays of each record to determine its popularity. For that purpose there is shown herein a play meter drum 170 nested within the magazine adjacent each record receiving pocket, one for each record (FIG. 18). Said drum carries peripheral numerals denoting the number of plays received by the adjacent record. To the side of said drum there is provided a series of indexing ratchet teeth 171, one for each number. The drum is rotatably mounted on a pin 172 mounted in the magazine. Mounted adjacent the drum there is a spring pressed holding pawl 173 for latching the ratchet teeth against rotation under tension of a return spring 174.

For indexing the ratchet wheel upon each play of the record there is provided an indexing pawl 175 having a ratchet tooth engaging lip 176 adapted to slide upon the pawl 173 into ratchet tooth engagement and move upwardly to index the drum one tooth. Said indexing pawl 175 is slidably mounted and guided in its movement by a bracket plate 177. Each shift arm 36, 37 carries an indexing pawl and bracket plate secured thereto adapted to freely pass through the aperture in the base plate 10 as the shift arm is actuated in shifting a record into position for centering on the turntable. Each bracket plate carries the shift arm limiting extension 62 with the adjustable stop screw 63, as shown in FIGS. 1 and 18.

Said indexing pawl 175 is biased by a spring 181 toward the ratchet teeth and limited in its upward movement by a projection 182. Upon the shift arm moving upwardly, said pawl will carry upwardly against and over the holding pawl 173 to engage and lift one of the ratchet teeth 171 to index the drum one increment. Thus, each record is provided with an indicator showing the number of plays resulting from the number of times shifted by the shift arm into playing position.

For conveniently returning the play meter drums to their zero position when the magazine is emptied and refilled with a new loading of records, there is provided a convenient cancelling device carried by an upstanding bracket 183 secured to the base plate 10 (FIG. 19). Said bracket is provided with a bearing plate 184 positioned at the proper height adjacent the holding pawls 173 of the series of play meters. Extending upwardly through the base plate with its bearing therein and in the spaced bearing plate 184, there is provided an oscillating shaft 185. Said shaft carries a cancelling finger 186 positioned to strike the tail portion 187 (FIG. 18) of the several holding pawls 173 when swung into cancelling position. Said finger is biased out of pawl engagement by a spring 188. Beneath the base plate 10 there is secured to the lower end of the shaft 185 an operating arm 189 adapted to be manually actuated to swing said finger to meter cancelling position.

The above arrangement is such that resetting of the play meters to zero may be quickly accomplished by moving the cancelling finger to its cancelling position and then manually rotating the magazine in its indexing or record positioning direction. Thus, the tail portions 187 of all of the play meters will be rapidly brought into engagement with the cancelling finger which will progressively swing the pawls 173 from tooth engagement to permit the individual play meters to rotate in their biased direction back to zero position. The magazine may be thus rotated freely since rotation in such direction frees the driving clutch spring from clutching and driving engagement with the magazine shaft.

As shown in FIG. 22 there is provision for rendering the record changing mechanism inoperative for servicing and loading, and prevent jamming in the event a selector pin is extended. For this purpose there is provided a slide bar 190 guided by the pin and slot mounting on the base plate 10 from which the pins 191 project. An upstanding finger grip 192 is provided at one end of the bar, and properly spaced intermediate its ends there are upstanding pins 193. Said pins 193 are positioned to engage the tail portions 194, respectively, of the pawls 14, 15 (FIG. 1). Said bar also carries a switch actuating plate 195 which controls the master switch B (FIG. 14).

Said bar 190 is normally positioned to the left (as shown in full lines, FIG. 22), wherein the switch B is closed and the pawls 14, 15 are permitted to function as above described. For servicing the magazine, said bar is moved to the right (dotted line position), whereupon the main record changing circuit will be opened through switch B and the pawls 14, 15 swung free of the magazine indexing plate 13.

It will be understood that the above described structures are merely illustrative of the invention. As various other embodiments and refinements might be made, all matter herein set forth or shown in the accompanying drawings is to be interpreted broadly and not in a limiting sense.

The invention is hereby claimed as follows:

1. In an automatic record changing device for phonographs, a movable magazine having a series of record supporting pockets, a drive shaft connected with said magazine rotatable to effect the movement thereof in one direction to a record selecting position, a cam freely rotatable about said shaft, a driving gear rotatable about said shaft, a reversible driving motor for driving said driving gear, a clutch element between said gear and shaft for driving said shaft upon said gear being rotated in one direction and releasing said shaft from rotation in the other direction, a second clutch between said gear and cam for driving said cam upon said gear being rotated in said other direction and releasing said cam from rotation upon said gear being driven in the first-mentioned direction, a selector device selectively operable to arrest the movement of said magazine to present a selected record to a record shifting station, a turntable positioned for receiving a record from said record shifting station, and a record shift member actuated by said cam for shifting a record from said station to position for centering on said turntable.

2. In an automatic record changing device for phonographs, a movable magazine supporting a plurality of phonograph records, a rotatable shaft for moving said magazine to present a selected record to a record transfer station, a selector device selectively operable to arrest the movement of said magazine with the selected record presented to said station, a rotatable turntable associated with said magazine for receiving said selected record therefrom, a shift member for shifting said selected record from said magazine to position for centering on said turntable, a driving gear rotatable about said shaft, a reversible motor for driving said driving gear, a clutch between said gear and shaft for driving said shaft upon said gear rotating in one direction, a cam freely rotatable about said shaft, a clutch between said driving gear and cam for rotating said cam upon said gear being rotated in the opposite direction, a motor reversing switch, and actuating means operable upon said selector device arresting the movement of said magazine for actuating said switch to reverse said motor for driving said cam to actuate said shift member.

3. In an automatic record changing device for phonographs, a rotatable magazine, a turntable mounted in offset centered relation to said magazine rotatable in the diametric plane thereof, a rotatable shaft secured to said magazine for effecting rotation thereof, means for shifting records from diametrically opposite sides of said magazine into position to be centered on said turntable for rotation in either of two opposite directions, a cam for actuating said record shifting means, a driving gear rotatable about said shaft adjacent said cam, a reversible driving motor for driving said driving gear, a clutch element between said gear and shaft for effecting rotation of said shaft upon said gear being driven in one direction and releasing said shaft from rotation when driven in the opposite direction, and a second clutch between said gear and cam for driving said cam upon said gear being rotated in said other direction and releasing said cam for rotation upon said gear being driven in the first-mentioned direction.

4. In an automatic record changing device for phonographs, a rotatable magazine having a series of radially disposed and angularly displaced pockets, each pocket being formed to receive a phonograph record, means for selectively positioning said magazine to present a pocket and record at one of two record transfer stations on opposite sides of said magazine, said stations lying substantially in the same diametric plane but with one station slightly offset angularly of said plane to approximately one-half the angular distance between pockets, a record receiving turntable offset axially from said magazine and rotatable in said diametric plane, a pair of oppositely disposed shift members, one for each station, means for pivotally mounting said members to permit swinging movement thereof through a magazine pocket when in registry with its station to shift the record therefrom to position for centering on said turntable, a load spring connected with each of said members urging it in its record shifting direction, a toggle linkage interconnecting said members, a cam controlled arm connected to said linkage for withdrawing said members to inoperative position against the tension of said springs to permit rotation of said magazine upon said cam being rotated to one position and permit said springs to urge said members in their record shifting direction upon rotation of said cam to another position, a reversible motor drive for alternately rotating said magazine and cam, a clutch connecting said motor drive with said magazine for rotating it to present a record to one of said stations when driven in one direction, and a clutch for connecting said motor drive with said cam for rotating it upon said motor drive being reversed.

5. In an automatic record changing device for phonographs, a rotatable magazine having a series of radially disposed and angularly displaced pockets, each pocket being formed to receive a phonograph record, means for selectively positioning said magazine to present a pocket and record at one of the record transfer stations on opposite sides of said magazine, said stations lying substantially in the same diametric plane but with one station slightly offset angularly of said plane to approximately one-half the angular distance between pockets, a record receiving turntable offset axially from said magazine and rotatable in said diametric plane, a pair of oppositely disposed shift members, one for each station, means for pivotally mounting said members to permit swinging movement thereof through a magazine pocket when in registry with its station to shift the record therefrom to position for centering on said turntable, a load spring connected with each said member urging it in its record shifting direction, a toggle linkage interconnecting said members, a cam controlled arm connected to said linkage for withdrawing said members to inoperative position against the tension of said springs to permit rotation of said magazine upon said cam being rotated to one position and permit said springs to urge said members in their record shifting direction upon rotation of said cam to another position, a reversible motor drive for alternately rotating said magazine and cam, a clutch connecting said motor drive with said magazine for rotating it to present a record to one of said stations when driven in one direction, a clutch for connecting said motor drive with said cam for rotating it upon said motor drive being reversed, and a switch control for said motor drive operable upon the arrest of said magazine to reverse said motor drive to rotate said cam.

6. In an automatic record changing device for phonographs, a rotatable magazine movable to present a record to one of a pair of opposed record shifting stations on opposite sides thereof, a turntable offset axially and centrally of said magazine rotatable in the diametric plane extending substantially through said magazine and stations, means for shifting a record from said magazine to said turntable when presented to one of said stations for reproduction of a selected side of the record according to the station to which it is presented, means for centering and clamping the shifted record to said turntable, a reproducer movable into and out of engagement with a selected side of the record as positioned upon said turntable, a driving element for rotating said magazine in one direction, a pawl and ratchet for restraining rotation of said magazine in the opposite direction, camming means rotatably operable to actuate said record shift mechanism, centering and clamping head and tone arm, means for arresting the rotation of said magazine to position a selected record at a selected one of said stations to present a selected side thereof to said turntable and reproducer, a single reversible motor having clutch means for rotating said magazine driving element upon said motor operating in one direction and rotating said camming means upon operating in the reverse direction, and latching mechanism associated with said magazine arresting means operable to reverse said motor upon said magazine being arrested for driving said camming means.

7. In an automatic record changing device for phonographs, a rotatable magazine having a series of radially disposed pockets, each pocket adapted to receive a phonograph record, means for rotating said magazine to a position for presenting a selected record to one of two stations offset substantially diametrically relative to said magazine according to which side of the record is to be played, a record receiving turntable offset from said magazine along the rotational axis of said magazine and rotatable in a diametric plane of said magazine, a record reproducer engageable with only one side of a selected record on said turntable and at all times lying on that one side of a selected record on said turntable, means for shifting said selected record from said magazine to said turntable for play and means whereby said shifting means is thereafter operative to effect return of said record from said turntable to said magazine, a guide plate yieldingly mounted on said device normally in close parallel relation to said turntable for guiding a record to and from said turntable, a circuit for controlling said magazine rotating means, and a safety switch in said circuit operatively connected to said guide plate and normally held in circuit closing position by said guide plate, and means whereby said switch is operated by said plate to open said circuit upon an initial limited rotation of said magazine with said record partially displaced from said magazine and lodged between said turntable and magazine, such rotation of said magazine bringing the partially displaced record into engagement with and effecting movement of said plate whereby further rotation of said magazine will be prevented.

8. In an automatic phonograph record player of the type including a magazine basket rotatable about a central vertical axis for holding a plurality of radially disposed phonograph record disks on edge together with a turntable mounted above the basket and centrally thereof for rotation about a horizontal axis and mechanism including a pair of vertically swingable lifting arms disposed on opposite sides of said vertical axis and beneath said basket and pivotal upwardly and inwardly toward said vertical axis for selectively lifting records vertically from opposite sides of said basket to said turntable and for returning records from the latter to the basket; said basket comprising a flat, annular rim, a plate disposed centrally of said rim and having a surface spaced radially inwardly from the rim, a plurality of radially disposed pairs of dividers secured to and connecting the rim and plate into a substantially rigid cage, said rim, plate and adjacent pairs of dividers defining therebetween pockets open at their top and bottom for receiving and supporting records at their lower portions, said adjacent pairs of dividers being spaced sufficiently to permit passage of a lifting arm therebetween for removing a record from the magazine to said turntable and for returning a record from the turntable to the magazine.

9. The combination of claim 8 wherein said plate is disposed below the rim, the arrangement being such that the peripheral edge of a record when disposed in a pocket will be supported at its bottom edge by said plate surface and at about the middle of its vertical portion by said rim.

10. The combination of claim 8 including indexing means on said basket for holding said basket in a predetermined rotational position for positioning a selected record in position for removal by one of said lifting arms, said indexing means including teeth on the outer periphery of said plate.

11. The combination of claim 8 including indexing means on said basket for holding said basket in a predetermined rotational position for positioning a selected record in position for removal by one of said lifting arms, said indexing means including teeth on the outer periphery of said plate, said rim and said outer periphery between said teeth being provided with notches, said dividers having fastening portions received in said notches.

12. The combination of claim 8 wherein said plate has an annular, upwardly curving surface extending from the inner periphery of said first-mentioned surface towards the said axis, said curving surface supporting the vertical portion of the edge of a record disk from its bottom to a position below its midportion.

13. The combination of claim 8 wherein said plate has a central, raised portion having a bore for mounting upon a vertical axle for rotation about said central vertical axis.

14. In an automatic record changing device for phonographs, a rotatable magazine having a series of radially disposed pockets, each pocket formed to receive a phonograph record, means for rotating said magazine about its central axis, a selector device having a series of selector pins, means whereby said selector pins are selectively operable to arrest the rotation of said magazine to present a selected record to one of two record transfer stations disposed substantially diametrically of one another relative to said magazine, a record receiving turntable offset along the central axis from said magazine and rotatable in the diametric plane thereof, a record reproducer mounted adjacent said turntable and engageable with a selected record on said turntable from only one side of said selected record, a pair of relatively oppositely disposed record shift members respectively at said stations, and each comprising an arm pivotally mounted in said diametric plane and pivotal in opposition to one another, record transfer guide means disposed between said magazine and said turntable and means whereby the one of said arms at said one of two stations is pivoted to move said one arm into engagement with the peripheral edge of the record presented thereto and in cooperation with said guide means acts to shift it from said magazine into position for centering on said turntable.

15. The combination as set forth in claim 14 wherein each of said arms is substantially scythe shaped.

16. An automatic phonograph record player as set forth in claim 14 wherein the magazine comprises a basket including a substantially flat annular rim, a plate disposed centrally of said rim and having a surface spaced radially inwardly from said rim, a plurality of radially disposed pairs of dividers secured to and connecting the rim and plate into a substantially rigid cage, said rim, said plate, and adjacent pairs of dividers defining therebetween said radially disposed pockets.

17. In an automatic phonograph record player as set forth in claim 16, wherein said plate is disposed at least in part on the axially opposite side of said rim relative to said turntable, the arrangement being such that the peripheral edge of a record when disposed in a pocket will be supported by said plate surface and by said rim.

18. The combination of claim 16 wherein said plate includes a concave surface concave generally in the direction of said turntable for supporting a portion of the edge of a record disc.

19. In an automatic record changing device for phonographs, a rotatable magazine having a series of radially disposed pockets respectively formed to receive a plurality of phonograph disc records, the records in the magazine pockets presenting a torroidal outline, said magazine being symmetrical and rotatable about its axis, means providing a pair of record transfer stations opposite one another substantially diametrically of said magazine, means for selectively stopping said magazine with a selected record adjacent one of said record transfer stations in accordance with the side of the record to be played, a record supporting turntable disposed between said record transfer stations displaced axially of said magazine from the median trans-axial plane thereof, the axes of said magazine and said turntable, including projections thereof, intersecting, said turntable having a spindle having a tapered nose projecting axially therefrom, at least said spindle being movable axially of itself, means normally holding at least said spindle in a retracted position, a record transfer arm pivotally mounted adjacent one end thereof at each of said record transfer stations and having a transverse record pusher arm thereon with a record engaging tip normally disposed outside of said magazine in idle position, said pusher arm being joined at one end to the end of said transfer arm opposite the pivot thereof, said pusher arm being arcuate and concave toward the pivot of said transfer arm, said pusher arm and transfer arm together being substantially scythe shaped, means for pivoting the transfer arm at said one station to bring the corresponding tip into engagement with said selected record, said corresponding tip moving through said magazine and pushing said selected record inward of said magazine and axially thereof from the median trans-axial plane into substantial alignment with said turntable and spindle means, means for thereafter advancing at least said spindle axially of itself through the center hole of said selected record to effect final alignment of said selected record and turntable, means for rotating said turntable, a record reproducer having an idle position radially outward of said turntable, said reproducer being adapted to engage a record from one side only and at all times being on that one side of a selected record on said turntable, means for shifting said reproducer relative to said turntable to bring said reproducer into reproducing engagement with said selected record, the pivoted record transfer arm pusher arm projecting through said magazine with the record engaging tip spaced from the selected record, means effective upon completion of playing said selected record for returning said reproducer to its idle position, for retracting at least said spindle, and for returning said record to its magazine pocket and said record transfer arm and pusher arm to idle position.

20. The combination as set forth in claim 19 wherein the axis of symmetry of the magazine is at an angle less than a straight angle with the horizontal, and wherein each pocket of the magazine has support means engaging a record on opposite sides of the center of gravity thereof regardless of the position of rotation of said magazine whereby said records are gravitationally retained in said magazine.

21. In an automatic record changing device for phonographs, a magazine rotatable about a vertical axis having a series of radially-disposed pockets, each pocket formed to receive a phonograph record standing on edge, means for rotating said magazine about said vertical axis, a selector device, means whereby said selector device is selectively operable to arrest the rotation of said magazine with a selected record in one station for playing one side of said record and in a second station disposed substantially diametrically thereof relative to said magazine for playing the opposite side of said record, a record receiving turntable offset upwardly along the vertical axis of the central portion of said magazine and rotatable in the diametric plane thereof, a record reproducer engageable with only one side of a selected record on said turntable and at all times lying on that one side of a selected record on said turntable, record transfer guide means extending inwardly and upwardly from said respective stations into underlying relation to said turntable, record shift members aligned with said stations and means whereby said shift members are selectively actuated upon said magazine being arrested in a position to present one of said records to one of said members, means whereby the said one of said members is moved into engagement with the peripheral edge of the record presented thereto to shift it inwardly and upwardly along said record transfer guide means from said magazine into position for centering on said turntable.

22. An automatic record changing device for phonographs as set forth in claim 21, wherein the selector device has a series of selector pins equal in number to twice the number of said radially disposed magazine pockets, there being one such pin for each side of every record, and wherein the means whereby the selector device is selectively operable includes manually operable means for selectively projecting one of said pins into position for cooperation with a stop on said magazine.

23. An automatic record changing device as set forth in claim 21 wherein the record transfer guide means includes a movable track pivoted centrally of the magazine for swinging substantially in the diametric plane of the magazine in which the turntable lies from one inclined position to another respectively leading from said stations.

24. An automatic record changing device as set forth in claim 21 wherein the record shift member at the selected station is aligned with the magazine pocket containing the selected record and the other member is out of alignment with the record pocket disposed diametrically of the magazine relative to the first mentioned pocket, said second member thereby abutting said magazine between pockets.

25. An automatic record changing device as set forth in claim 24 wherein the means for selectively actuating the shift members includes yieldable drive means.

26. An automatic record changing device as set forth in claim 25 wherein the other record shift member is offset from the plane of the first mentioned record shift member one half of the distance between magazine pockets.

27. An automatic record changing device as set forth in claim 21 wherein the means whereby one of the record shift members is actuated comprises cam means, and whereby the means for rotating the magazine comprises a reversible drive motor for alternately driving said magazine and said cam means in reverse directions, and further including unidirectional clutch elements interposed between said motor and said magazine for driving said magazine when said motor rotates in a given direction, one way clutch means interposed between said motor and said cam and operable upon rotation of said motor in the opposite direction to drive said cam means for reversely operating said motor in said given direction for first driving said magazine, and means operable when said selected record in said magazine is positioned adjacent the selected station to reverse said motor for thereafter driving said cam means.

28. An automatic phonograph record playing mechanism comprising, a rotary record storage magazine rotatable about a first axis inclined to the horizontal, means carried by the magazine for storing phonograph records therein in a toroidal radial arrangement, a rotary record playing turntable rotatable about a second axis perpendicularly disposed in respect to said first axis, said turntable including means for supporting and rotating a record in a plane substantially parallel to and proximate to said first axis, a pair of record shifting arms movable substantially in the plane of said turntable and operable to move records to and from the turntable from opposite sides of said magazine, a guide pivotally mounted substantially in the plane of said turntable and between said arms and pivotable relatively away from a record being moved from said magazine and forming an inclined guide ramp along which a record is moved by a record shifting arm, a control drum cooperable with the magazine to control the movements thereof, and control mechanism for controlling the rotation of the turntable, the shifting of said arms and the movement of said magazine in predetermined timed relation.

29. A phonograph record playing mechanism as defined in claim 28 wherein said first axis is vertical, said records being held in the storage magazine by gravity, and wherein means is provided to hold a record on said turntable during the rotation thereof.

30. A phonograph record playing mechanism as defined in claim 28 wherein said arms are pivotally mounted upon axes parallel to said second axis and symmetrically disposed in relation thereto.

31. A phonograph record playing mechanism as defined in claim 28 wherein said drum is concentric with said magazine and cooperable with stop structure rotatable with the magazine about said first axis to locate the magazine in selected rotary positions.

32. In an automatic phonograph, the combination of an annular magazine rotatable about a generally vertical axis and including means for supporting an annular series of records of predetermined size in generally vertical positions to be moved by rotation of the magazine selectively into either of two generally vertical record transfer positions located on opposite sides of the axis of the magazine, a turntable rotatable about a generally horizontal axis for playing records in a playing position generally parallel to said transfer positions, said playing position being located horizontally between said record transfer positions and being offset upwardly in relation to said transfer positions, means forming two inclined record support tracks underlying said record playing position and extending downwardly in diverging directions which are generally tangential to lower portions of said respective record transfer positions, record pusher means for pushing records from said respective transfer positions upwardly along said respective tracks into underlying relation to said record playing position, both of said respective tracks having upper portions formed by a track switch element mounted to be engaged by a record moving up either of said tracks and to be moved by the record to one of two positions of the switch element in which the switch element forms a continuation of the track up which the record is moved, a record centering element associated with said turntable and being dimensioned to extend into the center of a record on the turntable, said record centering element defining a tapered annular cam surface for lifting a record from either of said record support tracks and from said pusher means for playing, said record support tracks each having a minimum spacing from the axis of said turntable which exceeds the radius of the records to be played by a substantial dimension which is less than the radial width of said annular cam on said record centering element, and means for effecting relative axial movement of said record centering element in relation to an adjacent record supported on either of said tracks to move the record centering element into the center of the record for camming the record clear of the coacting track for playing.

33. In an automatic phonograph the combination of a movable magazine having means for supporting a plurality of records, means for moving said magazine along a predetermined path within which individual records are located by the magazine selectively in a generally vertical record transfer station, a turntable rotatable about a generally horizontal axis to rotate records for playing in a playing station generally coplanar with said transfer station, said playing station being offset both upwardly and horizontally with reference to said transfer station, and record transfer means for transferring individual records between said transfer station and said turntable in said playing station, said transfer means including a record support track underlying said playing station and being inclined downwardly into record supporting alinement with a lower portion of said transfer station, said transfer means including a record pusher element reversibly movable through said transfer station toward said playing station to move a record from said transfer station up said track into underlying relation to said record playing station and to subsequently pace return movement of the record by gravity along said track to said transfer station, and said transfer means including means for lifting into coaxial relation to said turntable records moved along said track into underlying relation to said playing station.

34. In an automatic phonograph, the combination of a toroidal magazine rotatable about a generally vertical axis and including means supporting an annular series of records in generally vertical positions for movement by rotation of the magazine selectively into either of two generally vertical and generally parallel record transfer positions located on opposite sides of the axis of the magazine, a record turntable mounted for rotation about a generally horizontal axis for playing records in a playing position which is located horizontally between said record transfer positions in generally parallel relation thereto and offset upwardly in relation to said transfer positions, and record transfer means for moving a record from either of said transfer positions to said playing position and subsequently returning the record to the transfer position from which it was removed; said record transfer means including means defining two inclined record support tracks underlying said record playing position and extending downwardly in diverging directions which are generally tangential to lower portions of said respective record transfer positions, both of said record support tracks having upper portions which are defined by a common track switch element movable through an overcenter position between two operative positions in which the switch element defines upper portions of said respective tracks, said track switch element being positioned for engagement by a record moving up either of said tracks and movement by the record into the operative position in which the switch element defines the upper portion of the track up which the record is moved, two record pusher elements alined with said respective record transfer positions and having normal positions lying outside of said record transfer positions, actuating means coacting with each of said record pusher elements to advance the coacting pusher element through the adjacent record transfer position and along the corresponding record support track for moving a record on edge from the corresponding transfer position along the adjacent record track into underlying relation to said record playing position and to progressively retract the coacting pusher element toward the normal position thereof to pace subsequent return movement by gravity of the record to the record transfer position from which the record was removed for playing, and means for lifting into coaxial relation to said turntable for playing a record moved along either of said tracks into underlying relation to said playing position.

35. In an automatic phonograph, the combination of an annular magazine rotatable about a generally vertical axis and including means for supporting an annular series of records of predetermined size in generally vertical positions to be moved by rotation of the magazine selectively into either of two generally vertical record transfer positions located on opposite sides of the axis of the magazine, a turntable mounted to receive records in a playing position generally parallel to said transfer positions, said playing position being located horizontally between said record transfer positions and being offset upwardly in relation to said transfer positions, means forming two inclined record support tracks underlying said record playing position and extending downwardly in diverging directions which are generally tangential to lower portions of said respective record transfer positions, record pusher means for pushing records from said respective transfer positions upwardly along said respective tracks into underlying relation to said record playing position, both of said respective tracks having upper portions formed by a track switch element shiftable by movement of records up said respective tracks between two different operating positions of the switch element so that the switch element automatically forms a continuation of the one of said tracks up which a record is moved, and record centering means associated with said turntable and including means for lifting a record through a predetermined maximum range of movement from either of said record support tracks into concentric relation to said turntable for playing, said record support tracks each having a minimum spacing from the axis of said turntable in said playing position which exceeds the radius of the records to be played by a substantial dimension which is less than said predetermined maximum range of record movement of said record centering means.

36. In an automatic phonograph the combination of a movable magazine having means for supporting a plurality of records of predetermined size, means for moving said magazine along a predetermined path within which individual records are located by the magazine selectively in a generally vertical record transfer station, a turntable rotatable about a generally horizontal axis to rotate records for playing in a playing station generally coplanar with said transfer station, said playing station being offset both upwardly and horizontally with reference to said transfer station, and record transfer means for transferring individual records between said transfer station and said turntable in said playing station, said transfer means including a record support track underlying said playing station and being inclined downwardly into record supporting alinement with a lower portion of said transfer station, said transfer means including a record pusher element reversibly movable through said transfer station toward said playing station to move a record from said transfer station up said track into underlying relation to said record playing station and to subsequently pace return movement of the record by gravity along said track to said transfer station, record centering means associated with said turntable and being dimensioned to extend into the center of a record on the turntable, said record centering means including means for lifting a record through a predetermined maximum range of movement from said record support track and from said pusher element into concentric relation to said turntable for playing, said record support track having a minimum spacing from the axis of said turntable which exceeds the radius of the records of predetermined size by a substantial dimension which is less than said predetermined range of record movement of said record lifting means; and means for operating said magazine, said record pusher element, said record centering means, and said turntable in timed relation to each other.

37. In an automatic phonograph, the combination of a toroidal magazine rotatable about a generally vertical axis and including means for supporting an annular series of records in vertical positions, means for rotating said magazine controllably to locate the individual records in the magazine selectably in either of two generally vertical record transfer positions located on opposite sides of the axis of the magazine in generally coplanar relation to each other, a turntable mounted to rotate records for playing in a playing position generally parallel to said transfer positions, said playing position being located horizontally between said transfer positions and being offset upwardly with reference to said transfer positions, and record transfer means for transferring a record from either of said transfer positions to said playing position; said record transfer means including means defining two stationary record support tracks disposed in inclined attitudes which are generally tangential to the lower portions of said respective record transfer positions and which extend upwardly in converging relation to each other below said playing position, a swingable record support track switch element mounted to swing between either of two positions in which the switch element forms an upward continuation of said respective stationary tracks, two record pusher elements alined with said respective record transfer positions and having normal positions outside of said transfer positions, means coacting with each of said record pusher elements to advance the pusher element through the coacting record transfer position and along the adjacent track to push a record from the transfer position and along the adjacent track and said track switch element into underlying relation to said playing position, and said actuating means for each record pusher element including means for progressively retracting the pusher element to its normal position outside of the corresponding record transfer position to progressively pace return of records by gravity along the track and to the transfer position corresponding to the pusher element.

38. In an automatic phonograph, the combination of a movable magazine having means for supporting a plurality of records, means for moving said magazine along a predetermined path within which records are carried by the magazine into a generally vertical transfer position, record selector means coacting with said magazine to terminate movement of the magazine selectively in different positions for locating selected records in said transfer position, a turntable mounted to rotate records for playing in a playing position generally coplanar with said transfer position, said playing position being offset both upwardly and horizontally with reference to the transfer position, record transfer means for moving individual records from said transfer position to said playing position and subsequently returning records after playing to said transfer position; said transfer means including an inclined record support track underlying said record playing position and being inclined downwardly toward said record transfer position in a direction generally tangential to said record transfer position, said record transfer means including record pusher means having a normal position outside of said record transfer position, actuating means for said record pusher means for advancing said pusher means against a record in said transfer position and along said track to move a record up said track from said transfer position into underlying relation to said playing position, and said actuating means including means for progressively retracting said record pusher means to said normal position thereof to pace the return of a record by gravity along said track to said transfer position.

References Cited in the file of this patent

UNITED STATES PATENTS

| | | |
|---|---|---|
| Re. 21,514 | Green | July 23, 1940 |
| 1,377,027 | Pettit | May 3, 1921 |
| 1,799,148 | Bryant | Apr. 7, 1931 |
| 2,572,609 | Gierwiatowski | Oct. 23, 1951 |
| 2,839,305 | Andres | June 17, 1958 |

FOREIGN PATENTS

| | | |
|---|---|---|
| 394,493 | Great Britain | June 29, 1933 |
| 466,769 | Great Britain | June 4, 1937 |